United States Patent
Ryu et al.

(10) Patent No.: US 10,440,524 B2
(45) Date of Patent: Oct. 8, 2019

(54) METHOD FOR TRANSMITTING AND RECEIVING A GROUP MESSAGE IN WIRELESS COMMUNICATION SYSTEM AND DEVICE THEREFOR

(71) Applicant: LG ELECTRONICS INC., Seoul (KR)

(72) Inventors: Jinsook Ryu, Seoul (KR); Youngdae Lee, Seoul (KR); Hyunsook Kim, Seoul (KR); Laeyoung Kim, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 159 days.

(21) Appl. No.: 15/323,374

(22) PCT Filed: Jun. 30, 2015

(86) PCT No.: PCT/KR2015/006735
§ 371 (c)(1),
(2) Date: Dec. 30, 2016

(87) PCT Pub. No.: WO2016/003174
PCT Pub. Date: Jan. 7, 2016

(65) Prior Publication Data
US 2017/0142560 A1 May 18, 2017

Related U.S. Application Data

(60) Provisional application No. 62/019,845, filed on Jul. 1, 2014.

(51) Int. Cl.
*H04W 4/08* (2009.01)
*H04W 68/02* (2009.01)
(Continued)

(52) U.S. Cl.
CPC ............... *H04W 4/08* (2013.01); *H04W 4/12* (2013.01); *H04W 68/02* (2013.01); *H04W 76/40* (2018.02)

(58) Field of Classification Search
CPC ......... H04W 4/08; H04W 68/02; H04W 4/12; H04W 76/40
See application file for complete search history.

(56) References Cited

U.S. PATENT DOCUMENTS

2012/0082037 A1* 4/2012 Wang .................. H04W 68/025
370/241
2013/0015953 A1* 1/2013 Hsu ........................ H04W 4/08
340/7.46

(Continued)

*Primary Examiner* — Shailendra Kumar
(74) *Attorney, Agent, or Firm* — Dentons US LLP

(57) ABSTRACT

A method for transmitting and receiving a group messaging in a wireless communication system and an apparatus for the same is disclosed. Particularly, the method for receiving a group message performed by a user equipment (UE) in a wireless communication system include receiving assistance information indicating whether a paging message is transmitted for each UE group from a network node, receiving the paging message from the network node on a paging occasion of the UE, when the transmission of the paging message for a group to which the UE is belonged in indicated by the assistance information, and receiving the group message, when a group message transmission for the group to which the UE is belonged is activated by the paging message.

6 Claims, 25 Drawing Sheets

(51) Int. Cl.
*H04W 4/12* (2009.01)
*H04W 76/40* (2018.01)

(56) References Cited

U.S. PATENT DOCUMENTS

| | | | |
|---|---|---|---|
| 2013/0130684 A1* | 5/2013 | Gomes | H04W 8/186 455/435.1 |
| 2013/0136072 A1* | 5/2013 | Bachmann | H04W 4/70 370/329 |
| 2013/0184013 A1* | 7/2013 | Chao | H04W 68/025 455/458 |
| 2015/0230063 A1* | 8/2015 | Chandramouli | H04W 4/70 455/466 |
| 2015/0245162 A1* | 8/2015 | Chao | H04L 12/189 370/312 |

* cited by examiner

[FIG. 1]
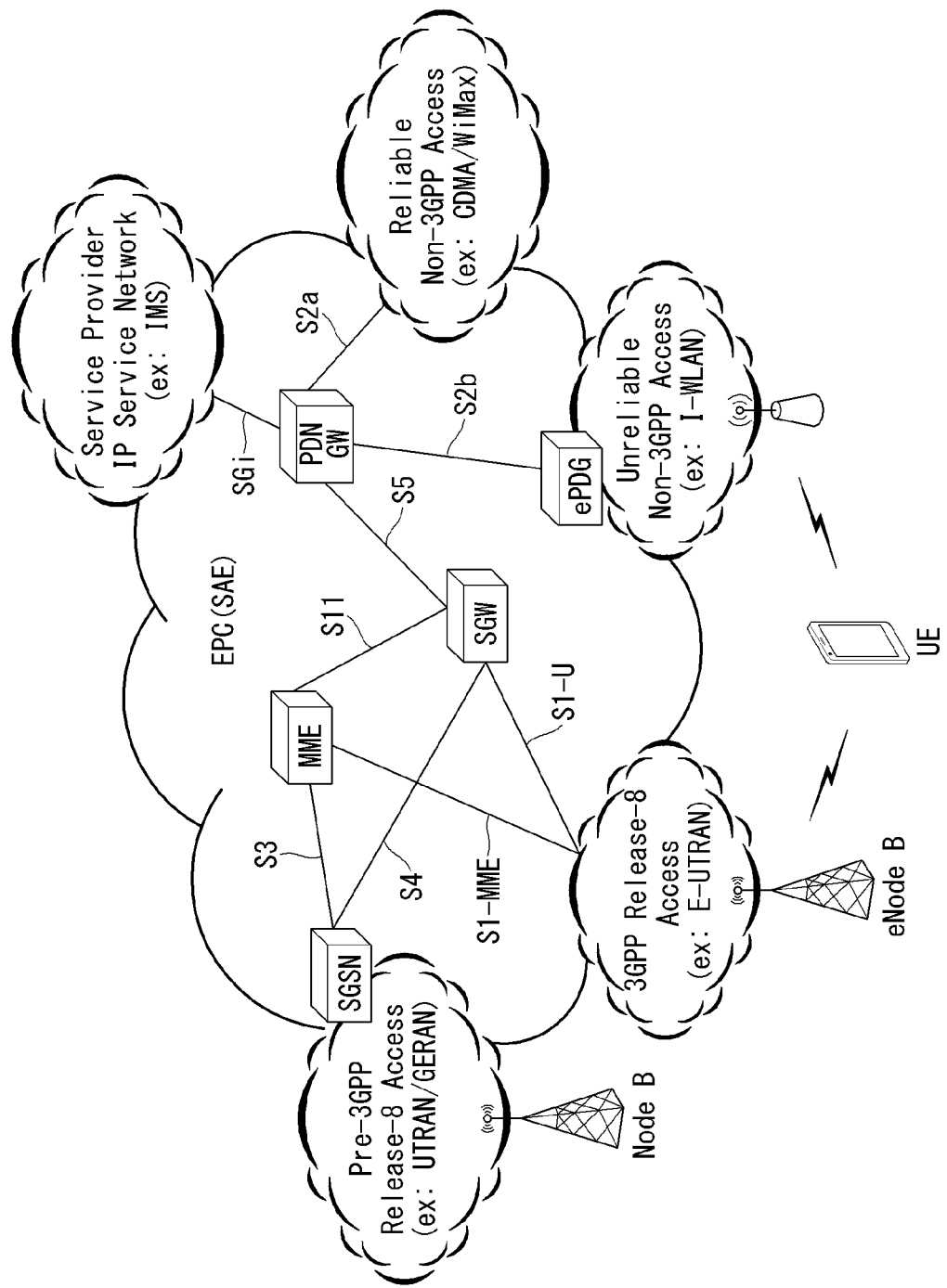

[FIG. 2]
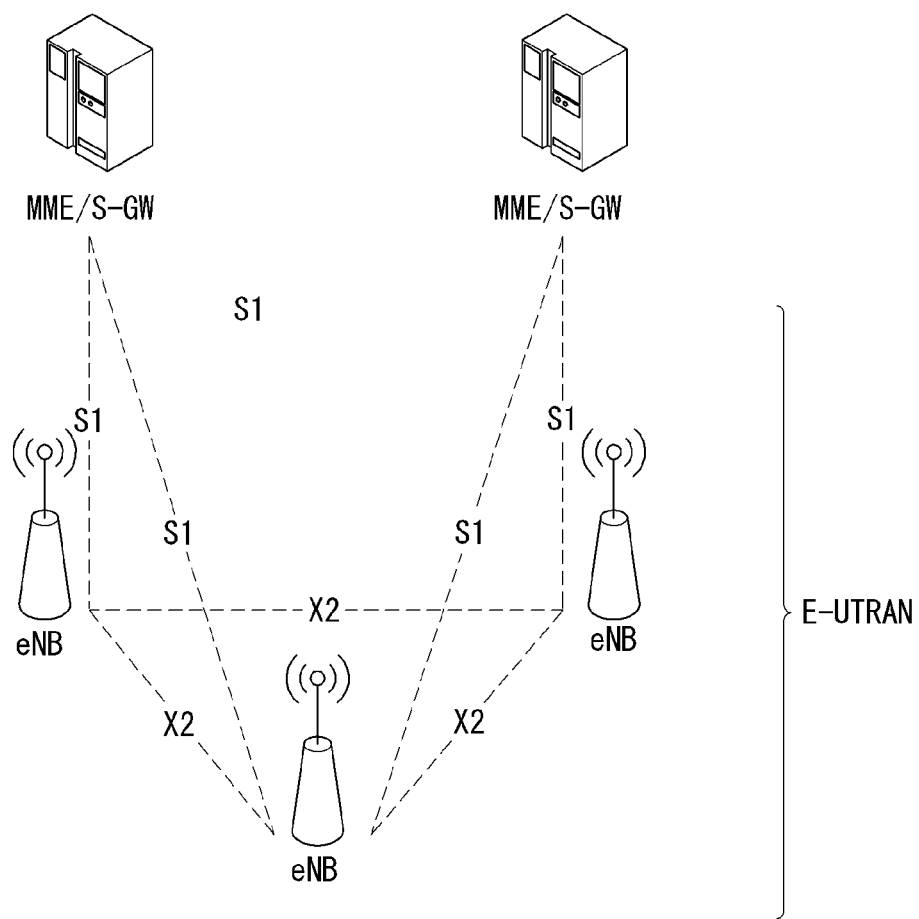

[FIG. 3]
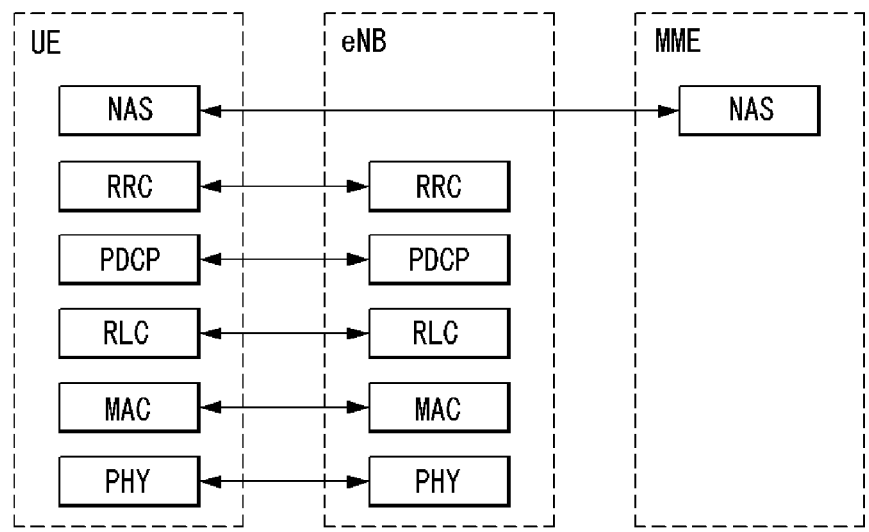
(a) control-plane protocol stack
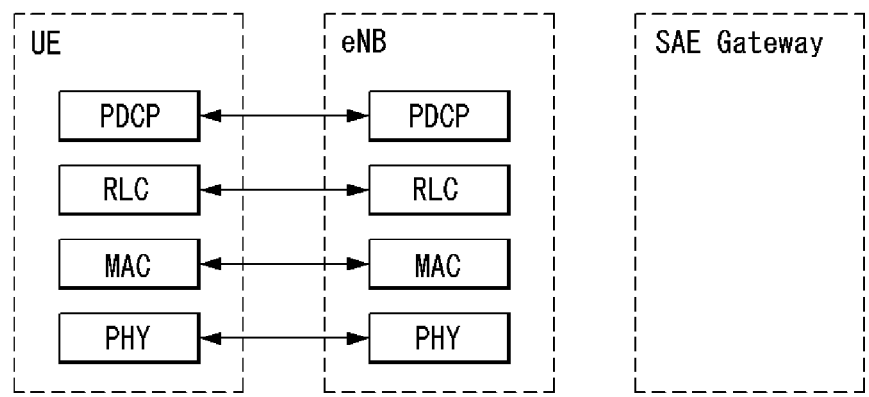
(b) user-plane protocol stack

[FIG. 4]
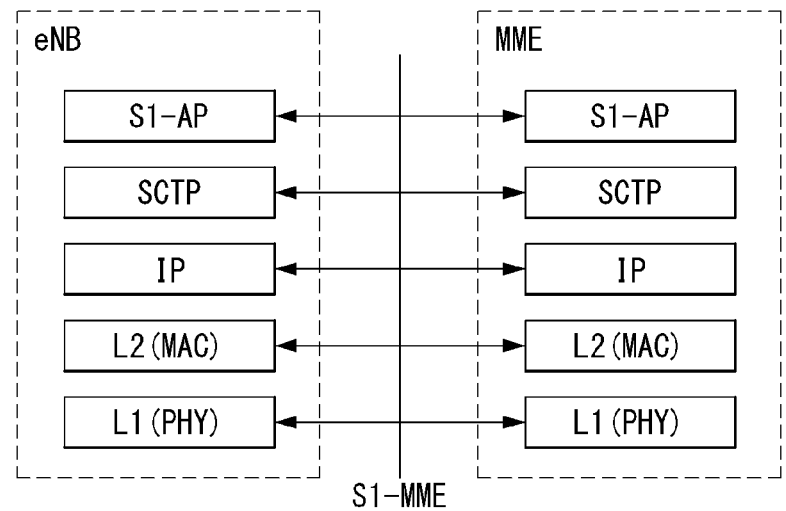
(a) control-plane protocol stack
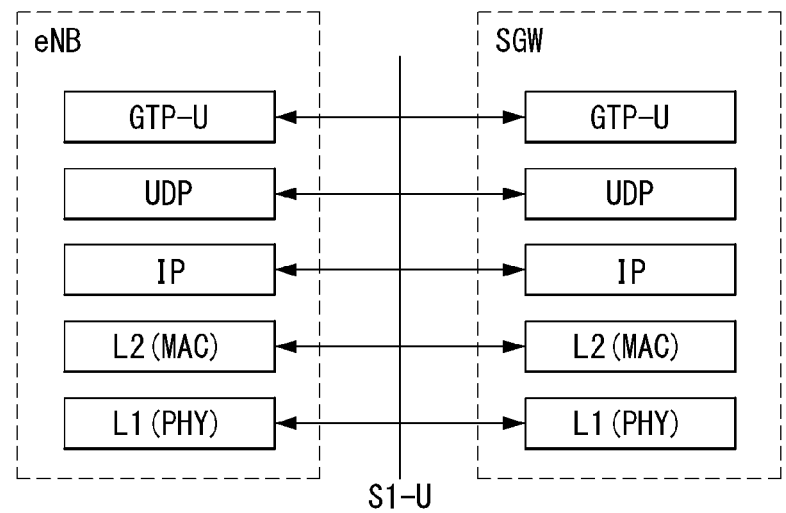
(b) user-plane protocol stack

[FIG. 5]
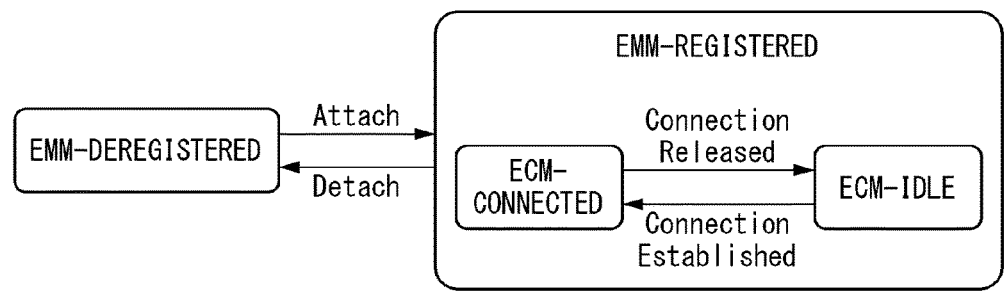

[FIG. 6]
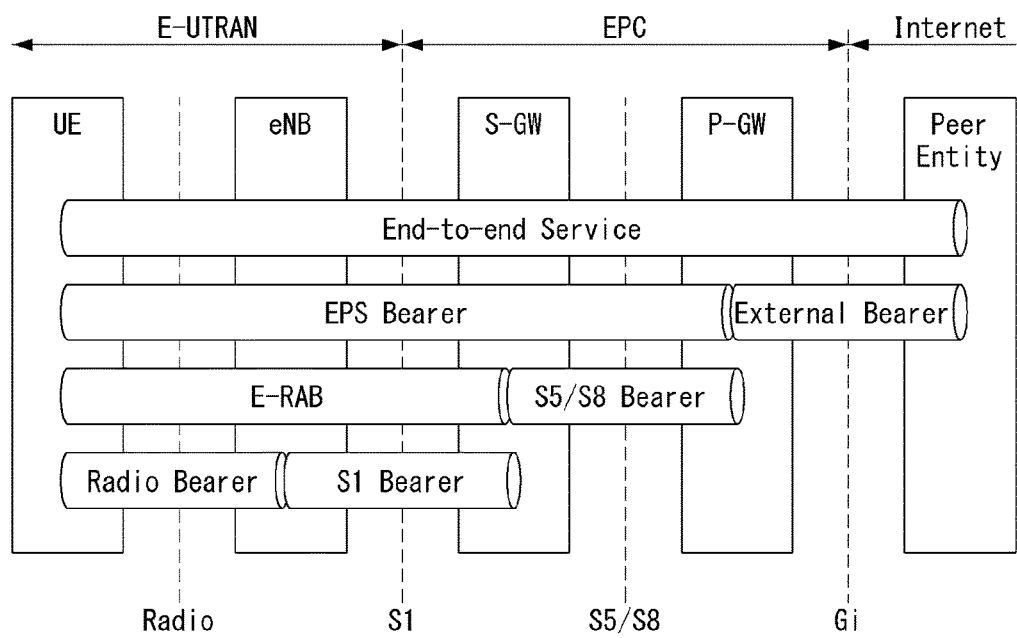

[FIG. 7]
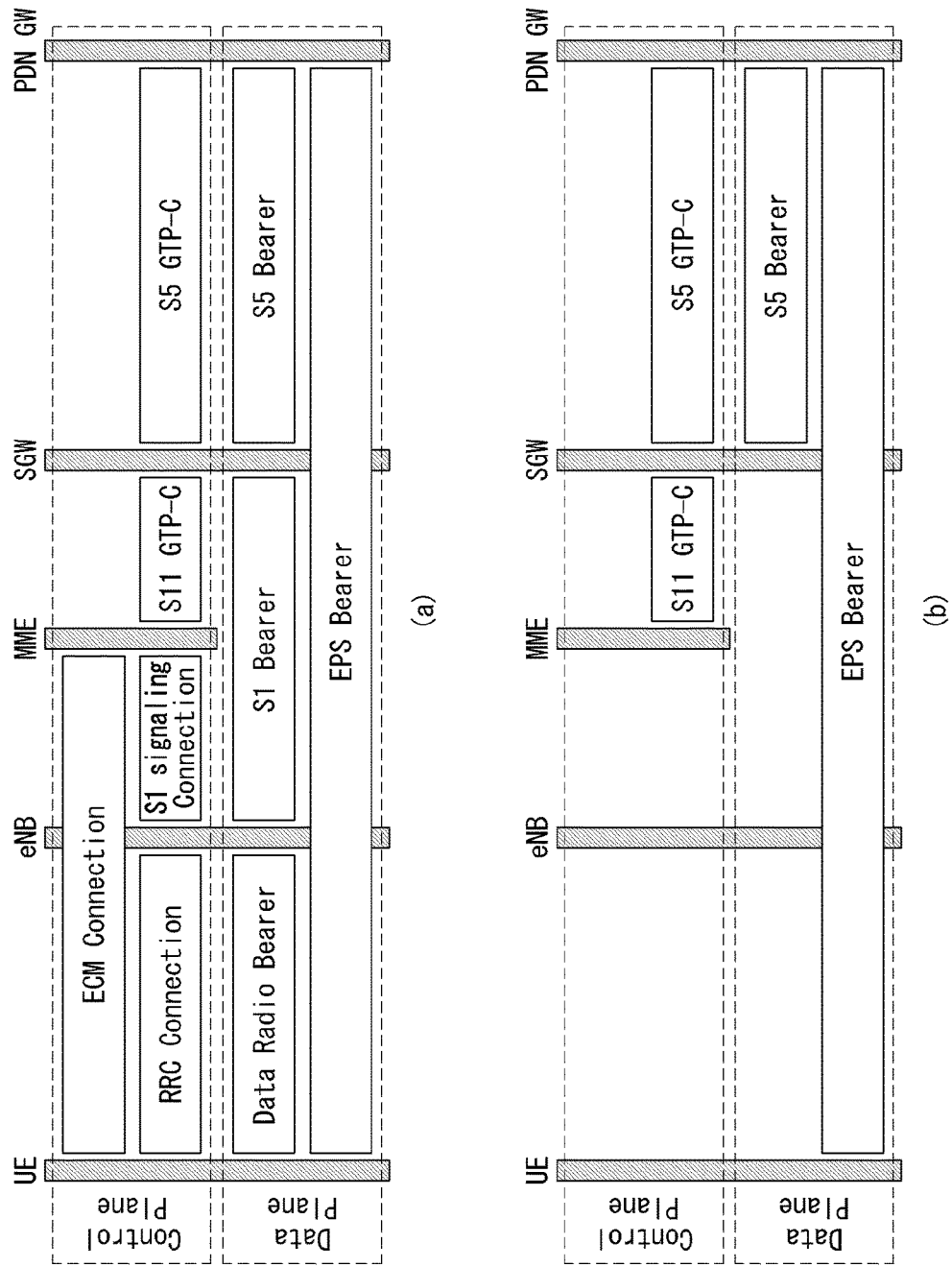

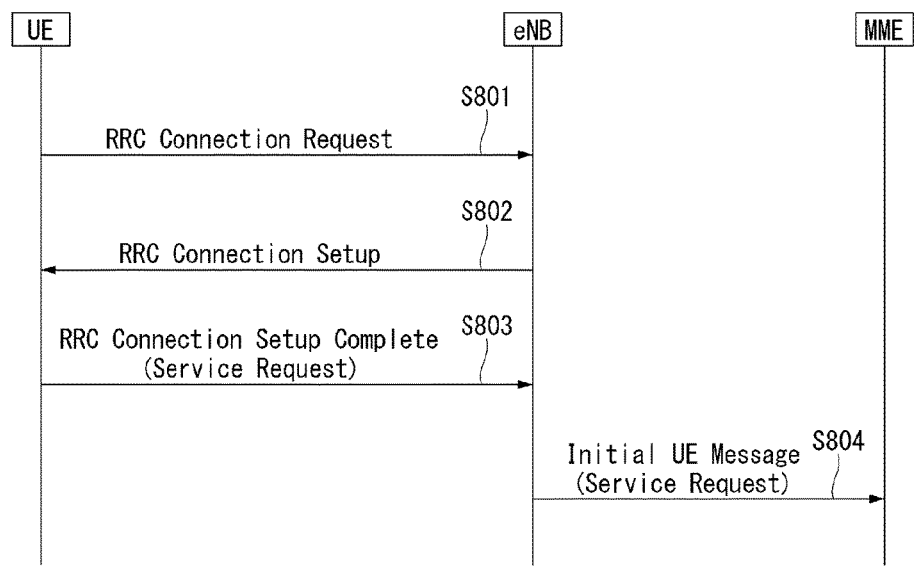
[FIG. 8]

[FIG. 9]
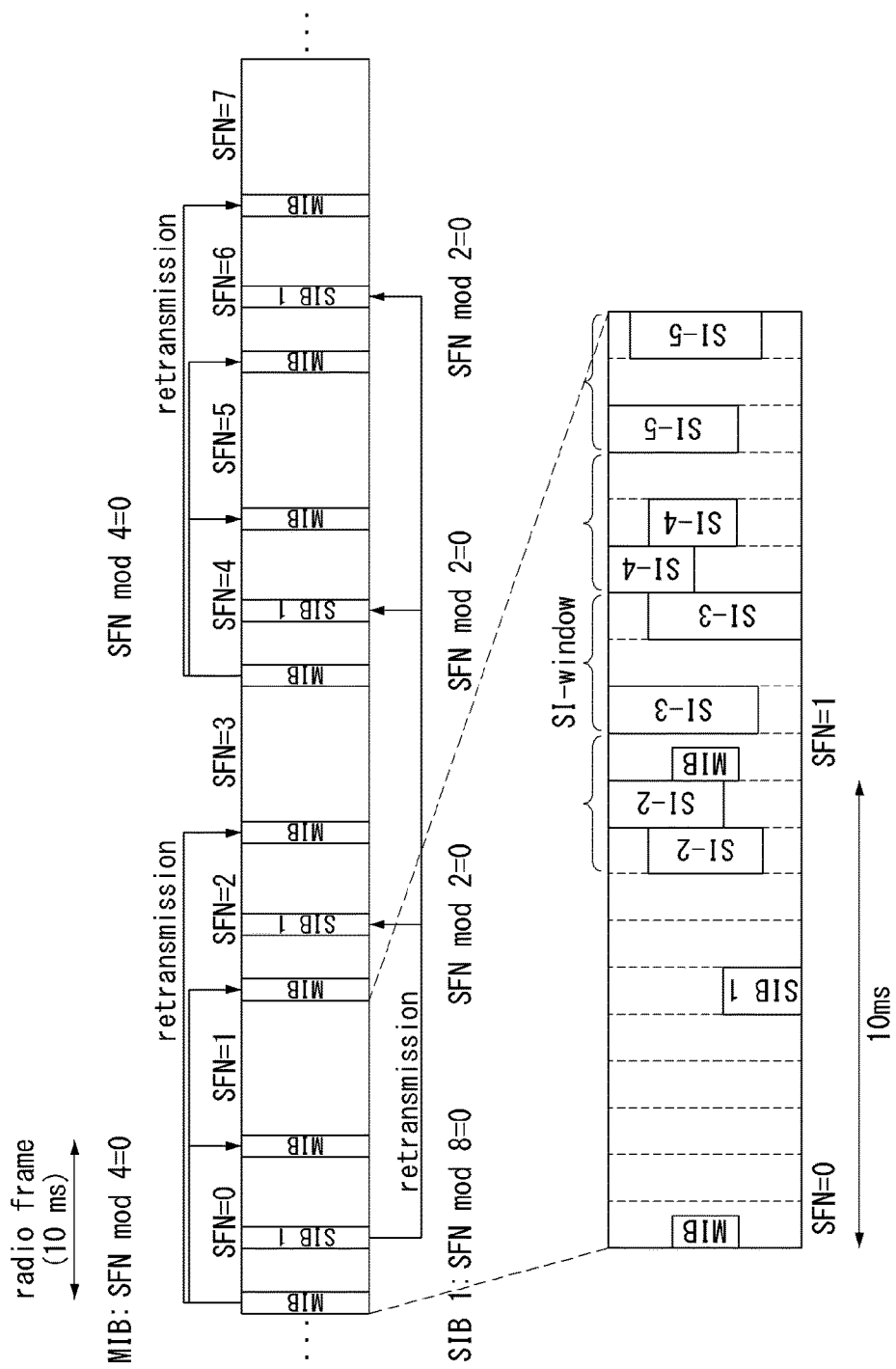

【FIG. 10】
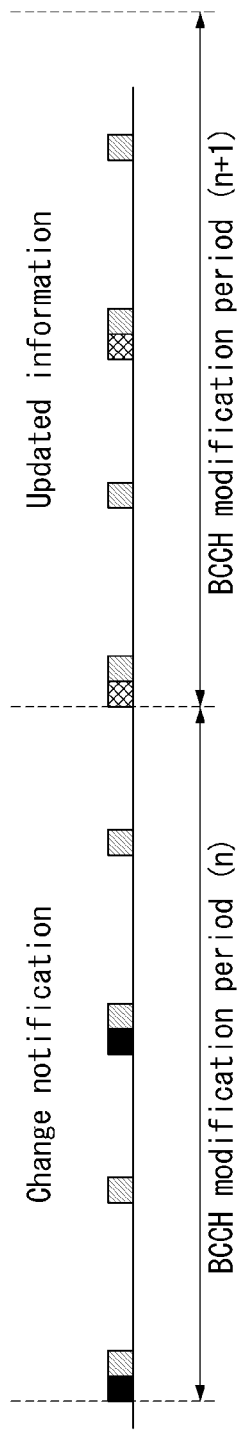

[FIG. 11]
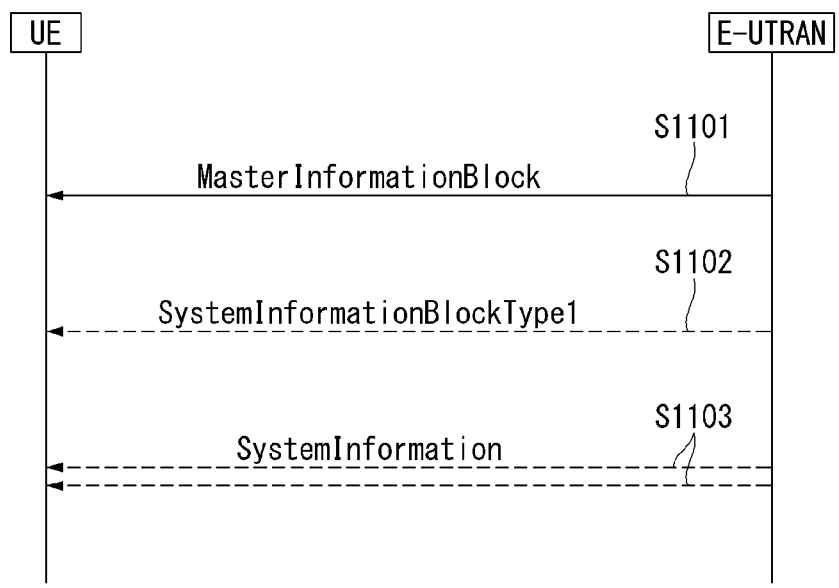

[FIG. 12]
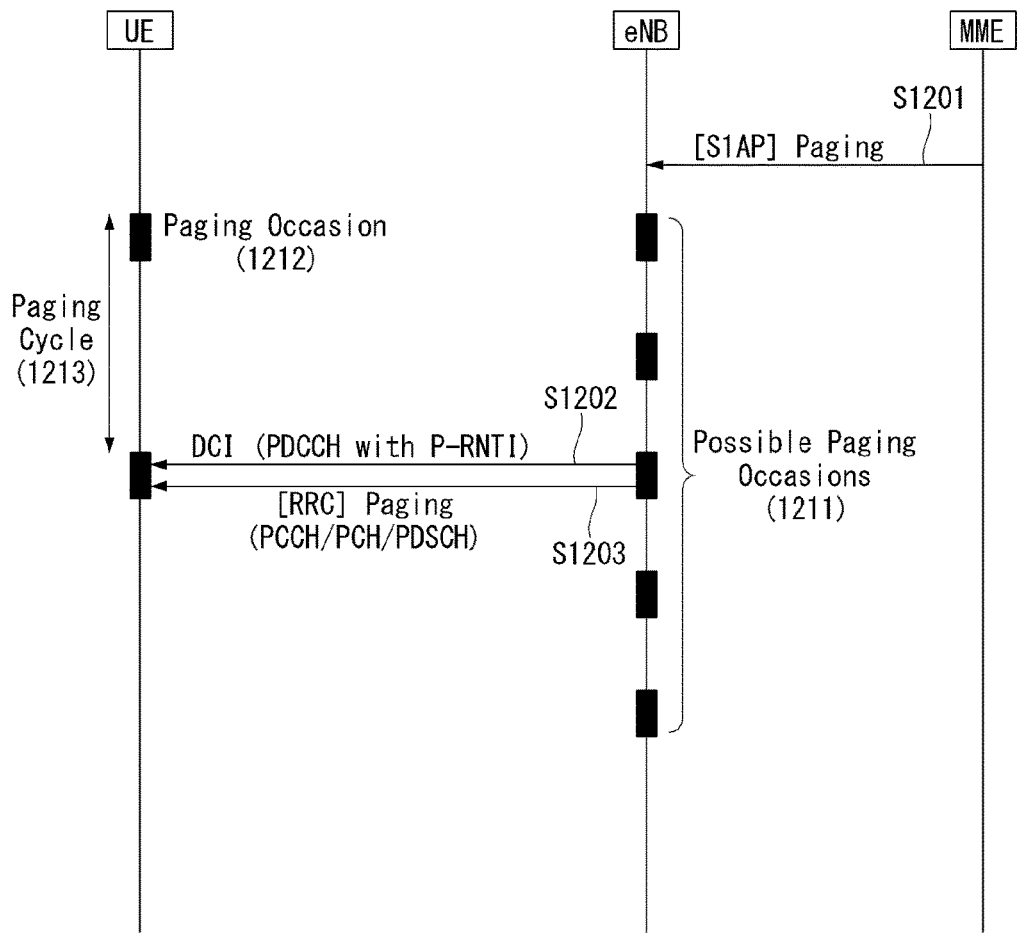

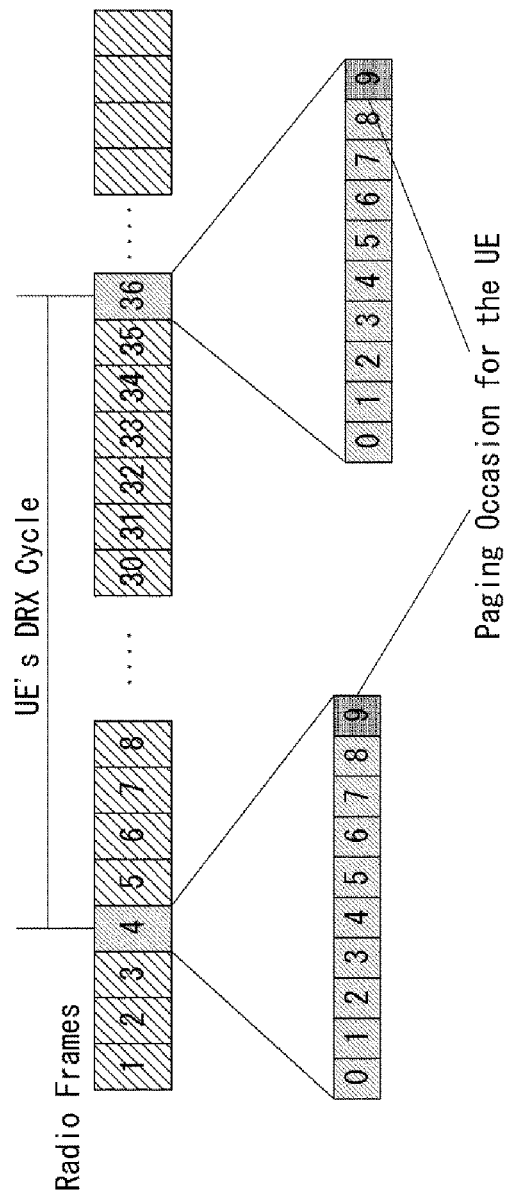
[FIG. 13]

[FIG. 14]
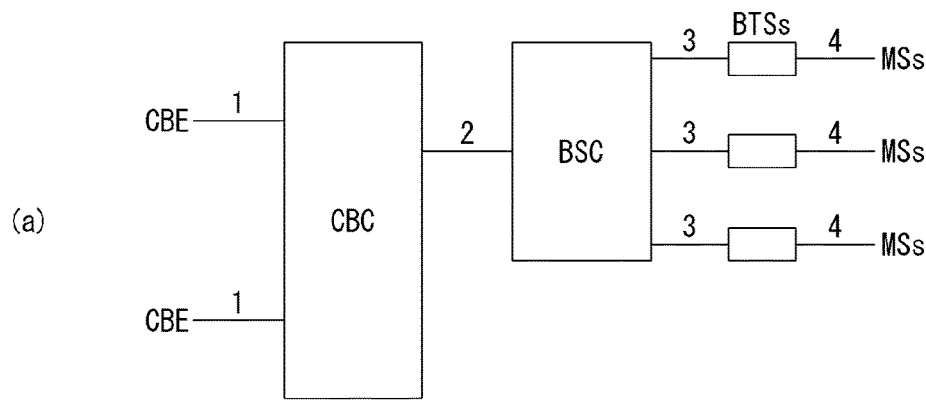
(a)
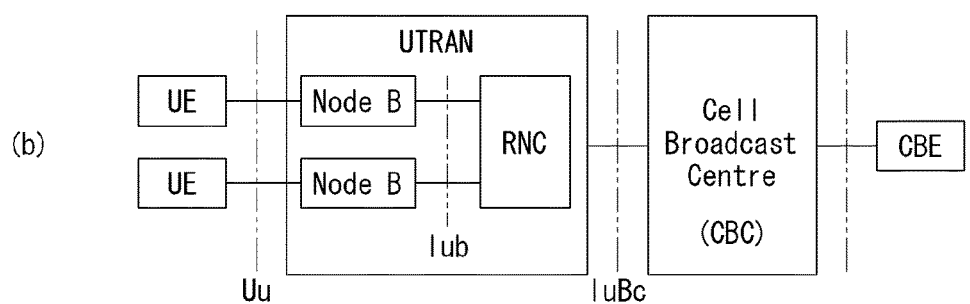
(b)
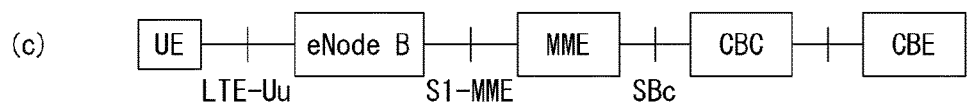
(c)

[FIG. 15]

| Octet 1 | | | | | | | | Octet 2 | | | | | | | |
|---|---|---|---|---|---|---|---|---|---|---|---|---|---|---|---|
| 7 | 6 | 5 | 4 | 3 | 2 | 1 | 0 | 7 | 6 | 5 | 4 | 3 | 2 | 1 | 0 |
| GS | | \multicolumn{6}{c}{Message Code} | | | | | | Update Number | | | |

| Octet 1 | | | | | | | | Octet 2 | | | | | | | |
|---|---|---|---|---|---|---|---|---|---|---|---|---|---|---|---|
| 7 | 6 | 5 | 4 | 3 | 2 | 1 | 0 | 7 | 6 | 5 | 4 | 3 | 2 | 1 | 0 |
| GS | | Message Code | | | | | | | | | | Update Number | | | |

[FIG. 16]

| 5 | 4 | 3 | 2 | 1 | 0 | 7 | 6 | 5 | 4 |
|---|---|---|---|---|---|---|---|---|---|
| Emergency User Alert | Popup | | | | | | | | |

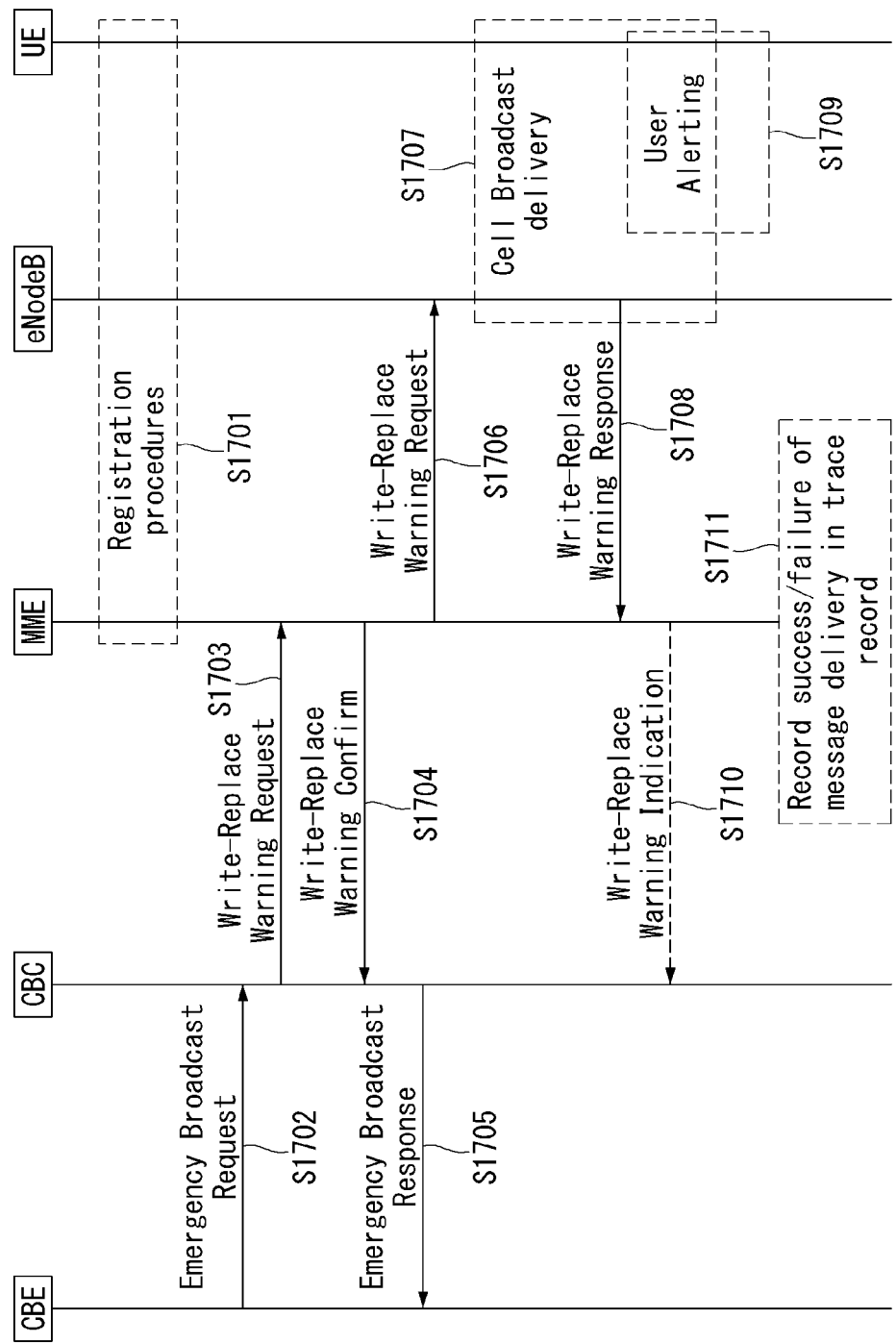
[FIG. 17]

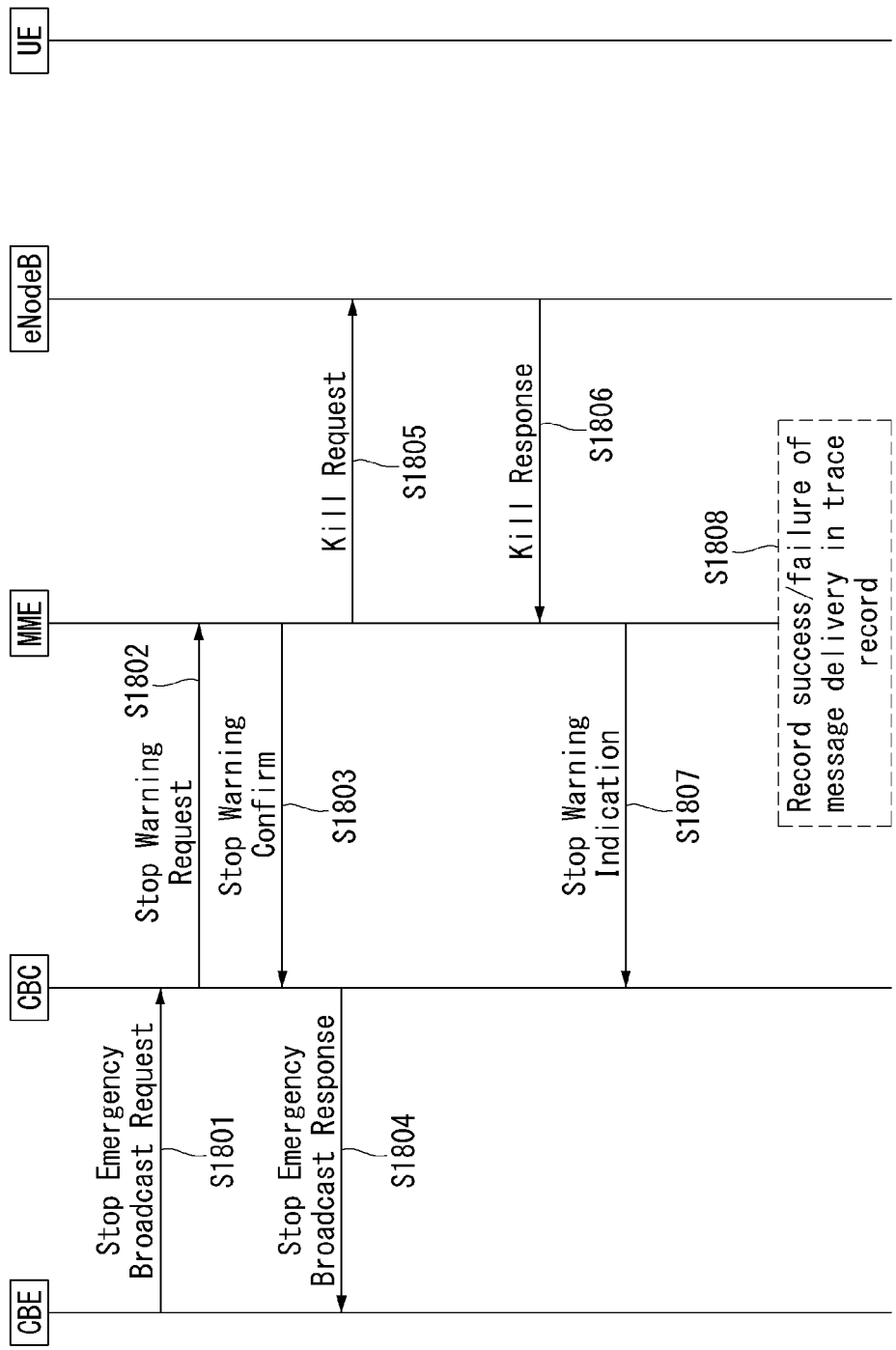
[FIG. 18]

[FIG. 19]
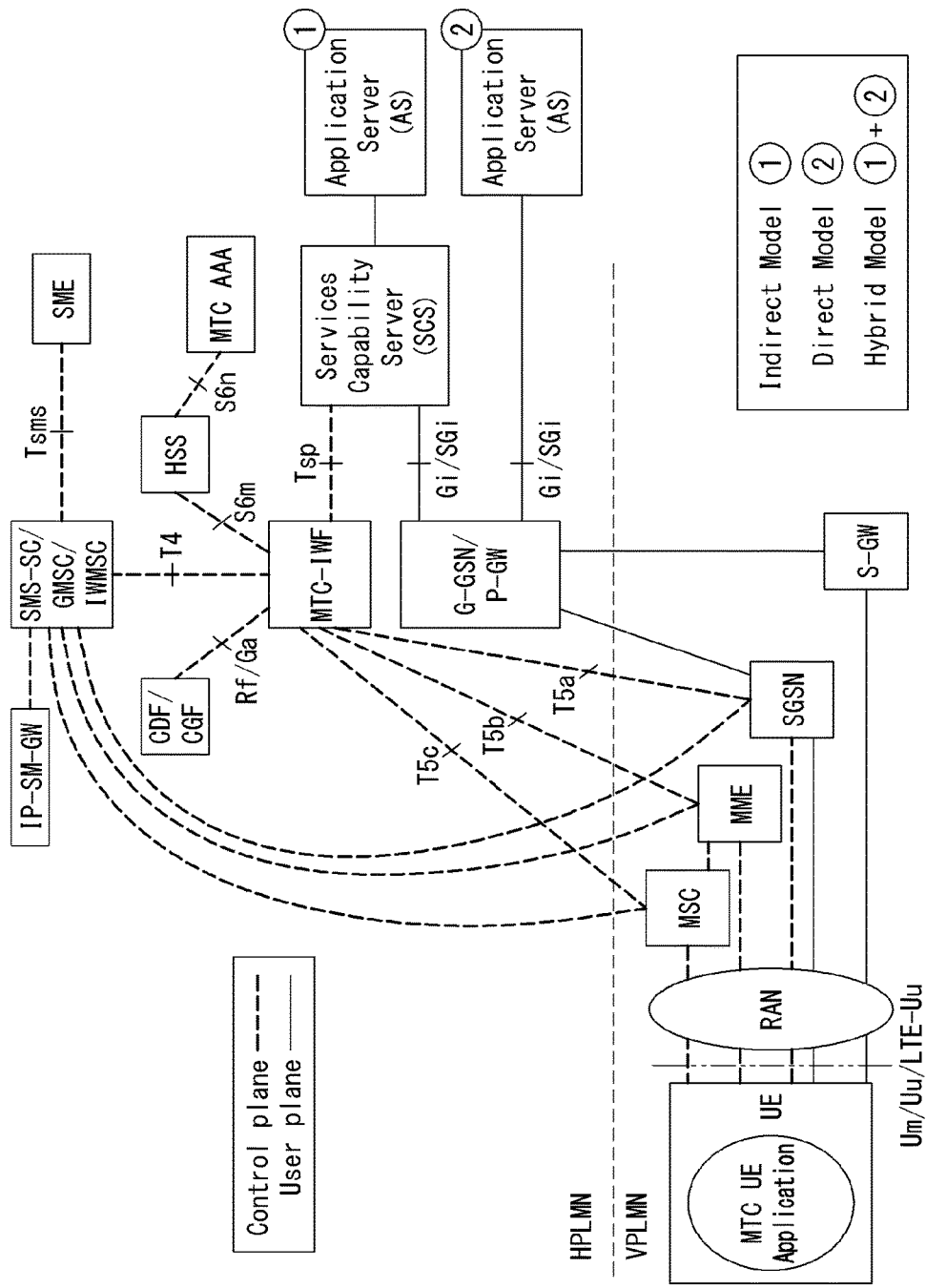

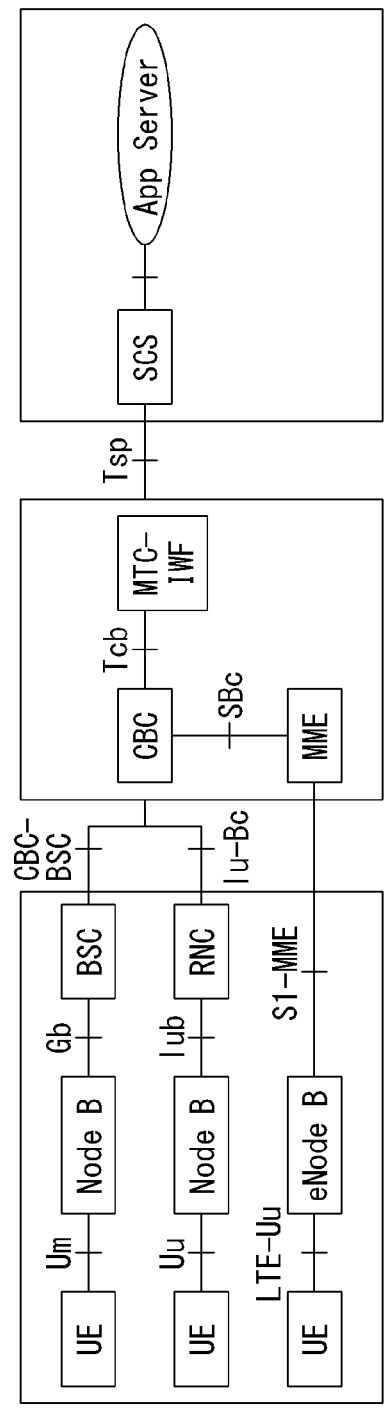
[FIG. 20]

[FIG. 21]
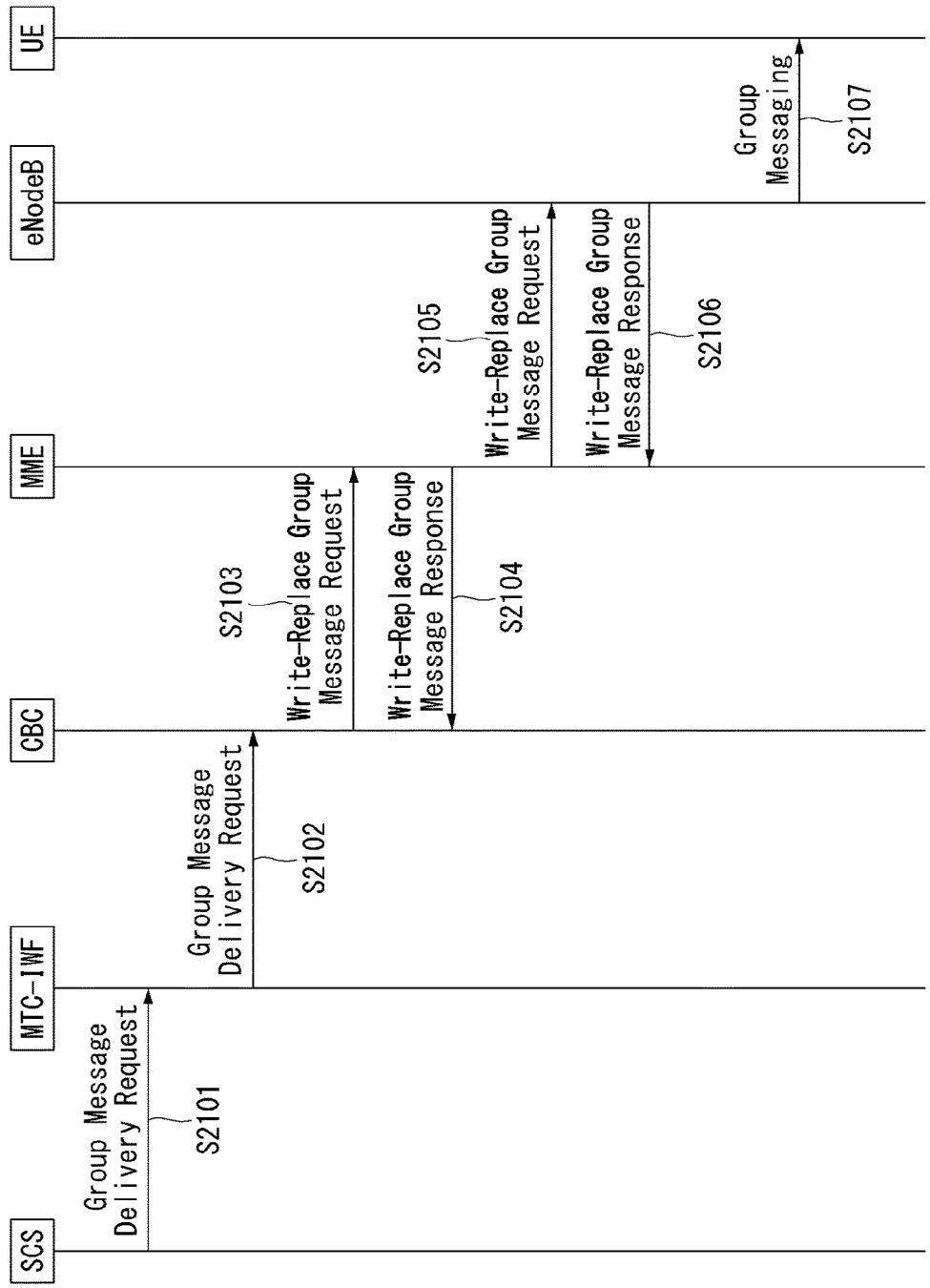

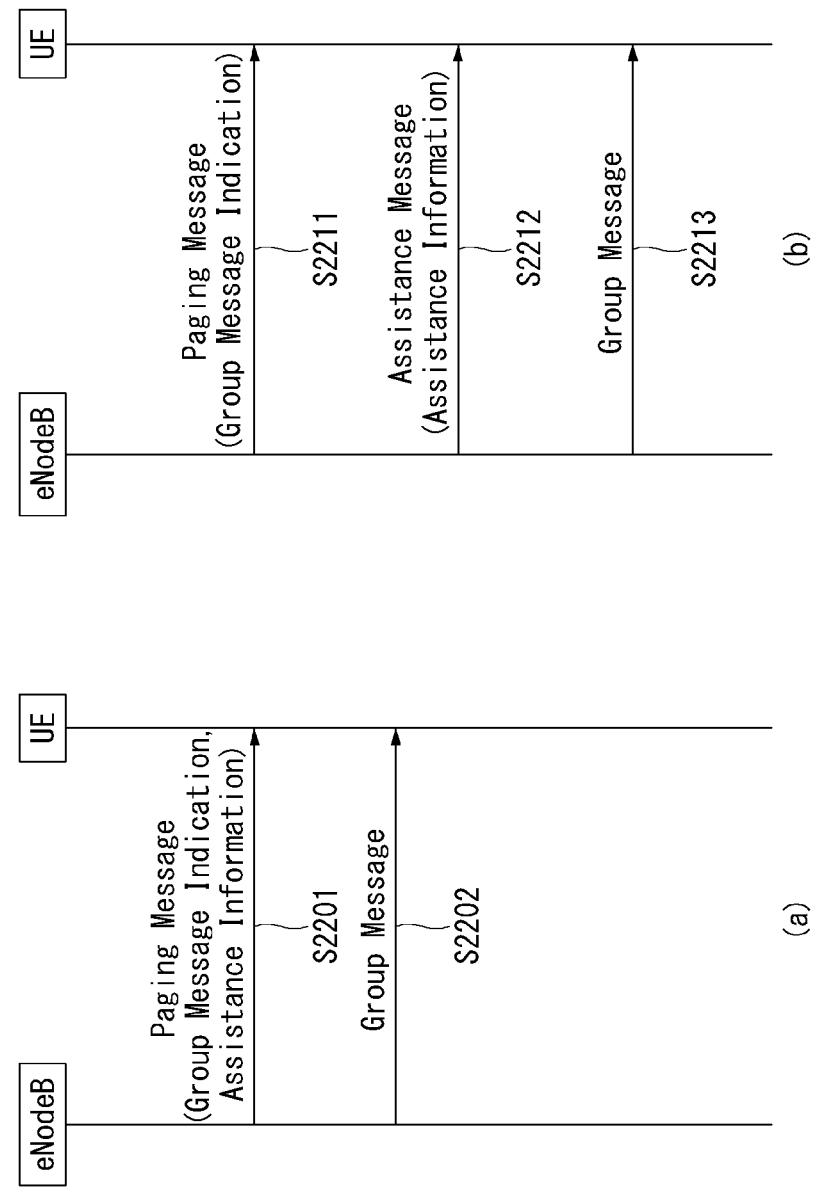

【FIG. 23】
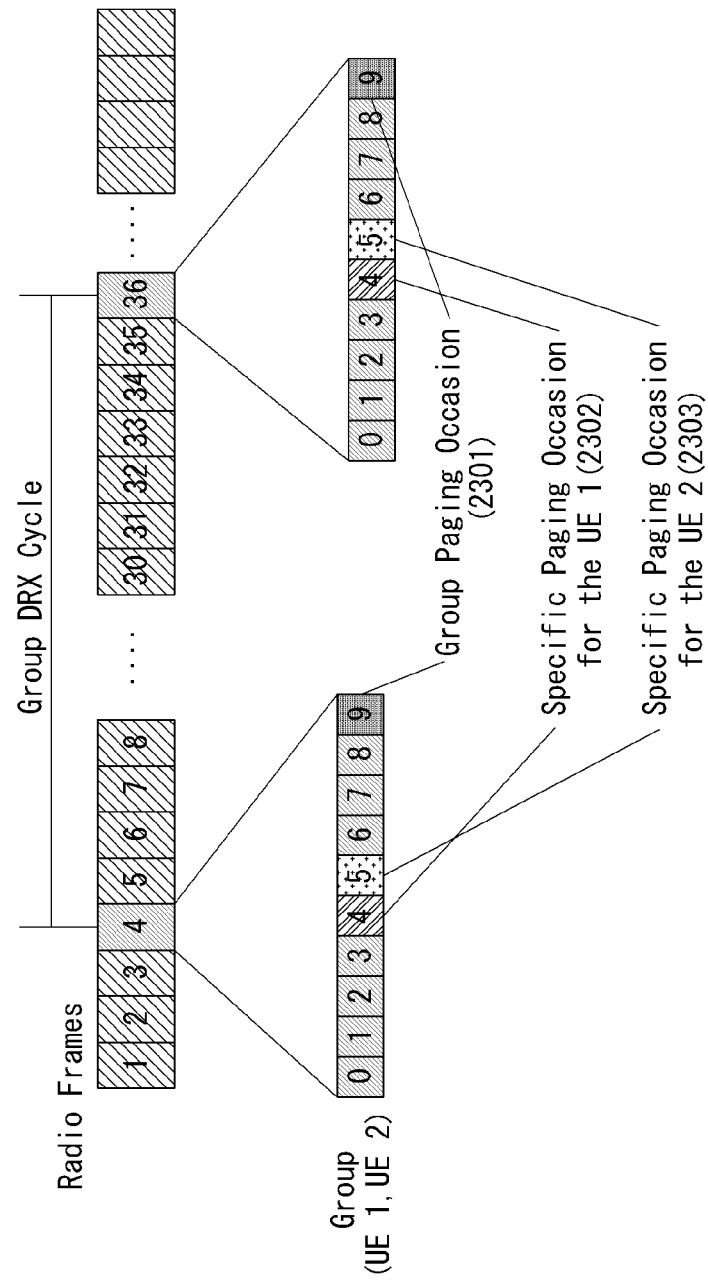

[FIG. 24]
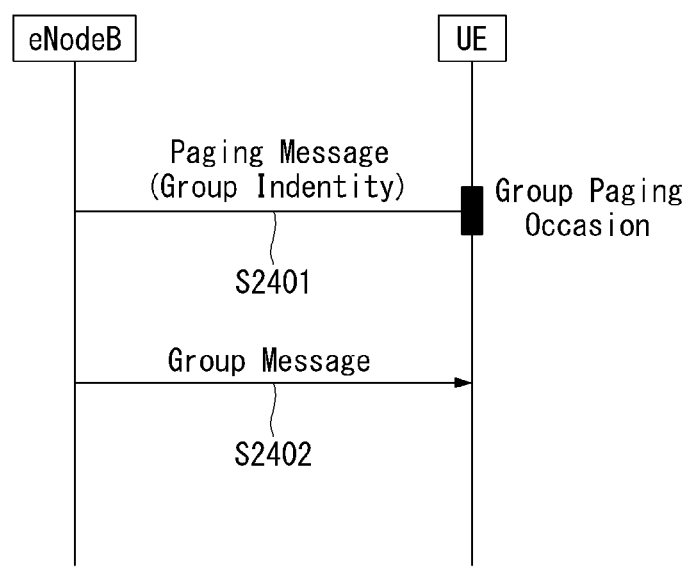

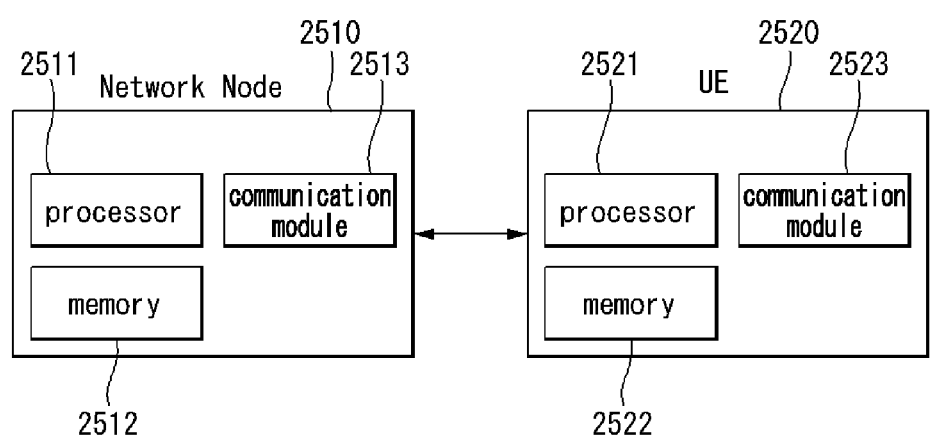
[FIG. 25]

METHOD FOR TRANSMITTING AND RECEIVING A GROUP MESSAGE IN WIRELESS COMMUNICATION SYSTEM AND DEVICE THEREFOR

CROSS-REFERENCE TO RELATED APPLICATIONS

This application is a National Stage Application of International Application No. PCT/KR2015/006735, filed on Jun. 30, 2015, which claims the benefit of U.S. Provisional Application No. 62/019,845, filed on Jul. 1, 2014, all of which are hereby incorporated by reference in their entirety for all purposes as if fully set forth herein.

TECHNICAL FIELD

The present invention relates to wireless communication systems, and more particularly, to a method for transmitting and receiving a group messaging in a wireless communication system that supports the Machine Type Communication (MTC) and an apparatus for supporting the same.

BACKGROUND ART

Machine Type Communication (MTC) refers to a communication scheme including one or more machines and is also called Machine-to-Machine (M2M) communication. A machine in this context refers to an entity which does not require direction intervention of a human. For example, not only the device such as a meter equipped with a mobile communication module or a vending machine, but also a user equipment such as a smart phone capable of connecting automatically to a network and performing communication without a human intervention is an example of the machine. Various examples of the machine are called MTC devices or terminals in this document. In other words, MTC refers to the communication performed by one or more machines (namely, MTC devices) without incorporating human operation/intervention.

MTC includes communication between MTC devices (for example, Device-to-Device (D2D) communication) and communication between an MTC device and an MTC Application Server. Examples of communication between an MTC device and an MTC application include communication between a vending machine and a server; communication between a Point Of Sale (POS) device and a server; and communication between an electricity, gas, or water meter and a server. Besides, applications based on MTC include security, transportation, and health care.

DISCLOSURE

Technical Problem

The group messaging means a way for transmitting the same message to a plurality of user equipments belonged to a group that is preconfigured. In the case of using the Commercial Mobile Alert System (CMAS) or the Earthquake and Tsunami Warning System (ETWS) indication as it is for transmitting a group messaging, all of the user equipments belonged to the same paging occasion read the group messaging at a time, and accordingly, it raises a problem that unnecessary operation is performed and the power consumption occurs according to it.

In order to solve the problem, an object of the present invention is to propose a method for transmitting/receiving a group message to/by the user equipments belonged to a group that requires the group messaging without a paging procedure of unintended user equipments and a cell broadcast service being influenced by the group messaging in a wireless communication system.

Technical Solution

According to an aspect of the present invention, a method for receiving a group message performed by a user equipment (UE) in a wireless communication system may include receiving assistance information indicating whether a paging message is transmitted for each UE group from a network node, receiving the paging message from the network node on a paging occasion of the UE, when the transmission of the paging message for a group to which the UE is belonged in indicated by the assistance information, and receiving the group message, when a group message transmission for the group to which the UE is belonged is activated by the paging message.

According to another aspect of the present invention, a UE for receiving a group message in a wireless communication system may include a communication module for transmitting and receiving a signal with an external device and a processor for controlling the user equipment, where the processor is configured to perform receiving assistance information indicating whether a paging message is transmitted for each UE group from a network node, receiving the paging message from the network node on a paging occasion of the UE, when the transmission of the paging message for a group to which the UE is belonged in indicated by the assistance information, and receiving the group message, when a group message transmission for the group to which the UE is belonged is activated by the paging message.

According to still another aspect of the present invention, a method for transmitting a group message performed by a network node in a wireless communication system may include transmitting a group message indication to a UE indicating whether a group message is transmitted and assistance information for identifying for which UE group the group message is to a UE, and transmitting the group message to the UE, where whether the UE receives the group message is determined based on the group message indication and the assistance information.

According to still another aspect of the present invention, a network node for transmitting a group message in a wireless communication system may include a communication module for transmitting and receiving a signal with an external device and a processor for controlling the network node, where the processor is configured to perform transmitting a group message indication indicating whether a group message is transmitted and assistance information for identifying for which user equipment (UE) group the group message is to a UE and transmitting the group message to the UE, where whether the UE receives the group message is determined based on the group message indication and the assistance information.

Preferably, the assistance information may be transmitted through a system information message or a common control channel.

Preferably, the assistance information may indicate a group identity allocated to each UE group or a modular value for an International Mobile Subscriber Identity (IMSI) for the UE.

Preferably, the assistance information may indicate a group message discriminating number which is predetermined for each UE group.

Preferably, the group message discriminating number may be configured through an attach procedure or a tracking area update procedure.

Preferably, the group message may be transmitted through a system information message.

Technical Effects

According to the embodiments of the present invention, a group message may transmit/receive efficiently a group message to/by the user equipments belonged to a group that requires the group messaging without a paging procedure of unintended user equipments and a cell broadcast service being influenced by the group messaging in a wireless communication system.

The technical effects of the present invention are not limited to the technical effects described above, and other technical effects not mentioned herein may be understood to those skilled in the art from the description below.

DESCRIPTION OF DRAWINGS

The accompanying drawings, which are included herein as a part of the description for help understanding the present invention, provide embodiments of the present invention, and describe the technical features of the present invention with the description below.

FIG. 1 illustrates an Evolved Packet System (EPS) to which the present invention can be applied.

FIG. 2 illustrates one example of an Evolved Universal Terrestrial Radio Access Network (E-UTRAN) to which the present invention can be applied.

FIG. 3 illustrates a radio interface protocol structure between a UE and an E-UTRAN in a wireless communication system to which the present invention can be applied.

FIG. 4 illustrates an S1 interface protocol structure in a wireless communication system to which the present invention can be applied.

FIG. 5 illustrates an EMM and ECM states in a wireless communication system to which the present invention can be applied.

FIG. 6 illustrates a bearer structure in a wireless communication system to which the present invention can be applied.

FIG. 7 illustrates transmission paths of a control plane and a user plane in an EMM registration state in a wireless communication system to which the present invention can be applied.

FIG. 8 is a view exemplifying an ECM connection establishment procedure in a wireless communication system to which the present invention can be applied.

FIG. 9 exemplifies a transmission of the system information in a wireless communication system to which the present invention can be applied.

FIG. 10 is a view exemplifying the modification of the system information in a wireless communication system to which the present invention can be applied.

FIG. 11 is a view exemplifying a system information acquisition procedure in a wireless communication system to which the present invention can be applied.

FIG. 12 is a view exemplifying a paging procedure in a wireless communication system to which the present invention can be applied.

FIG. 13 is a view for describing a paging occasion in a wireless communication system to which the present invention can be applied.

FIG. 14 exemplifies architecture for the cell broadcast service in a wireless communication system to which the present invention can be applied.

FIG. 15 is a view exemplifying the serial number of the CBS message in a wireless communication system to which the present invention can be applied.

FIG. 16 is a view exemplifying the message code format of the CBS message in a wireless communication system to which the present invention can be applied.

FIG. 17 is a view exemplifying a warning message transmission procedure in a wireless communication system to which the present invention can be applied.

FIG. 18 is a view exemplifying a warning message cancellation procedure in a wireless communication system to which the present invention can be applied.

FIG. 19 is a view exemplifying Machine-Type Communication (MTC) architecture in a wireless communication system to which the present invention can be applied.

FIG. 20 is a view exemplifying a group messaging architecture based on CBS/PWS in a wireless communication system to which the present invention can be applied.

FIG. 21 is a view exemplifying a group messaging transmission procedure based on the CBS/PWS architecture in a wireless communication system to which the present invention can be applied.

FIG. 22 is a view exemplifying a group message transmission and reception method according to an embodiment of the present invention.

FIG. 23 is a view for describing a group paging occasion according to an embodiment of the present invention.

FIG. 24 is a view exemplifying a group message transmission and reception method according to an embodiment of the present invention.

FIG. 25 illustrates a block diagram of a communication device according to one embodiment of the present invention.

BEST MODE FOR INVENTION

In what follows, preferred embodiments according to the present invention will be described in detail with reference to appended drawings. The detailed descriptions provided below together with appended drawings are intended only to explain illustrative embodiments of the present invention, which should not be regarded as the sole embodiments of the present invention. The detailed descriptions below include specific information to provide complete understanding of the present invention. However, those skilled in the art will be able to comprehend that the present invention can be embodied without the specific information.

For some cases, to avoid obscuring the technical principles of the present invention, structures and devices well-known to the public can be omitted or can be illustrated in the form of block diagrams utilizing fundamental functions of the structures and the devices.

A base station in this document is regarded as a terminal node of a network, which performs communication directly with a UE. In this document, particular operations regarded to be performed by the base station may be performed by a upper node of the base station depending on situations. In other words, it is apparent that in a network consisting of a plurality of network nodes including a base station, various operations performed for communication with a UE can be performed by the base station or by network nodes other than the base station. The term Base Station (BS) can be replaced with a fixed station, Node B, evolved-NodeB (eNB), Base Transceiver System (BTS), or Access Point (AP). Also, a terminal can be fixed or mobile; and the term can be replaced with User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter can be part of the base station, and a receiver can be part of the terminal. Similarly, in uplink transmission, a transmitter can be part of the terminal, and a receiver can be part of the base station.

Specific terms used in the following descriptions are introduced to help understanding the present invention, and the specific terms can be used in different ways as long as it does not leave the technical scope of the present invention.

The technology described below can be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA can be implemented by such radio technology as Universal Terrestrial Radio Access (UTRA) or CDMA2000. TDMA can be implemented by such radio technology as Global System for Mobile communications (GSM), General Packet Radio Service (GPRS), or Enhanced Data rates for GSM Evolution (EDGE). OFDMA can be implemented by such radio technology as the IEEE 802.11 (Wi-Fi), the IEEE 802.16 (WiMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

Embodiments of the present invention can be supported by standard documents disclosed in at least one of wireless access systems including the IEEE 802, 3GPP, and 3GPP2 specifications. In other words, among the embodiments of the present invention, those steps or parts omitted for the purpose of clearly describing technical principles of the present invention can be supported by the documents above. Also, all of the terms disclosed in this document can be explained with reference to the standard documents.

To clarify the descriptions, this document is based on the 3GPP LTE/LTE-A, but the technical features of the present invention are not limited to the current descriptions.

Terms used in this document are defined as follows.

Universal Mobile Telecommunication System (UMTS): the 3rd generation mobile communication technology based on GSM, developed by the 3GPP Evolved Packet System (EPS): a network system comprising an Evolved Packet Core (EPC), a packet switched core network based on the Internet Protocol (IP) and an access network such as the LTE and UTRAN. The EPS is a network evolved from the UMTS.

NodeB: the base station of the UMTS network. NodeB is installed outside and provides coverage of a macro cell.

eNodeB: the base station of the EPS network. eNodeB is installed outside and provides coverage of a macro cell.

User Equipment (UE): A UE can be called a terminal, Mobile Equipment (ME), or Mobile Station (MS). A UE can be a portable device such as a notebook computer, mobile phone, Personal Digital Assistant (PDA), smart phone, or a multimedia device; or a fixed device such as a Personal Computer (PC) or vehicle-mounted device. The term UE may refer to an MTC terminal in the description related to MTC.

IP Multimedia Subsystem (IMS): a sub-system providing multimedia services based on the IP International Mobile Subscriber Identity (IMSI): a globally unique subscriber identifier assigned in a mobile communication network Machine Type Communication (MTC): communication performed by machines without human intervention. It may be called Machine-to-Machine (M2M) communication.

MTC terminal (MTC UE or MTC device): a terminal (for example, a vending machine, meter, and so on) equipped with a communication function operating through a mobile communication network and performing an MTC function MTC server: a server on a network managing MTC terminals. It can be installed inside or outside a mobile communication network. It can provide an interface through which an MTC user can access the server. Also, an MTC server can provide MTC-related services to other servers (in the form of Services Capability Server (SCS)) or the MTC server itself can be an MTC Application Server.

MTC application: services (to which MTC is applied) (for example, remote metering, traffic movement tracking, weather observation sensors, and so on)

MTC Application Server: a server on a network in which (MTC) applications are performed MTC feature: a function of a network to support MTC applications. For example, MTC monitoring is a feature intended to prepare for loss of a device in an MTC application such as remote metering, and low mobility is a feature intended for an MTC application with respect to an MTC terminal such as a vending machine.

MTC subscriber: an entity having a connection relationship with a network operator and providing services to one or more MTC terminals.

MTC group: an MTC group shares at least one or more MTC features and denotes a group of MTC terminals belonging to MTC subscribers.

Services Capability Server (SCS): an entity being connected to the 3GPP network and used for communicating with an MTC InterWorking Function (MTC-IWF) on a Home PLMN (HPLMN) and an MTC terminal.

External identifier: a globally unique identifier used by an external entity (for example, an SCS or an Application Server) of the 3GPP network to indicate (or identify) an MTC terminal (or a subscriber to which the MTC terminal belongs). An external identifier comprises a domain identifier and a local identifier as described below.

Domain identifier: an identifier used for identifying a domain in the control region of a mobile communication network service provider. A service provider can use a separate domain identifier for each service to provide an access to a different service.

Local identifier: an identifier used for deriving or obtaining an International Mobile Subscriber Identity (IMSI).

A local identifier should be unique within an application domain and is managed by a mobile communication network service provider.

Radio Access Network (RAN): a unit including a Node B, a Radio Network Controller (RNC) controlling the Node B, and an eNodeB in the 3GPP network. The RAN is defined at the terminal level and provides a connection to a core network.

Home Location Register (HLR)/Home Subscriber Server (HSS): a database provisioning subscriber information within the 3GPP network. An HSS can perform functions of configuration storage, identity management, user state storage, and so on.

RAN Application Part (RANAP): an interface between the RAN and a node in charge of controlling a core network (in other words, a Mobility Management Entity (MME)/Serving GPRS (General Packet Radio Service) Supporting Node (SGSN)/Mobile Switching Center (MSC)).

Public Land Mobile Network (PLMN): a network formed to provide mobile communication services to individuals. The PLMN can be formed separately for each operator.

Non-Access Stratum (NAS): a functional layer for exchanging signals and traffic messages between a terminal and a core network at the UMTS and EPS protocol stack. The NAS is used primarily for supporting mobility of a terminal and a session management procedure for establishing and maintaining an IP connection between the terminal and a PDN GW.

In what follows, the present invention will be described based on the terms defined above.

FIG. 1 illustrates an Evolved Packet System (EPS) to which the present invention can be applied.

The network structure of FIG. 1 is a simplified diagram restructured from an Evolved Packet System (EPS) including Evolved Packet Core (EPC).

The EPC is a main component of the System Architecture Evolution (SAE) intended for improving performance of the 3GPP technologies. SAE is a research project for determining a network structure supporting mobility between multiple heterogeneous networks. For example, SAE is intended to provide an optimized packet-based system which supports various IP-based wireless access technologies, provides much more improved data transmission capability, and so on.

More specifically, the EPC is the core network of an IP-based mobile communication system for the 3GPP LTE system and capable of supporting packet-based real-time and non-real time services. In the existing mobile communication systems (namely, in the 2nd or 3rd mobile communication system), functions of the core network have been implemented through two separate sub-domains: a Circuit-Switched (CS) sub-domain for voice and a Packet-Switched (PS) sub-domain for data. However, in the 3GPP LTE system, an evolution from the 3rd mobile communication system, the CS and PS sub-domains have been unified into a single IP domain. In other words, in the 3GPP LTE system, connection between UEs having IP capabilities can be established through an IP-based base station (for example, eNodeB), EPC, and application domain (for example, IMS). In other words, the EPC provides the architecture essential for implementing end-to-end IP services.

The EPC comprises various components, where FIG. 1 illustrates part of the EPC components, including a Serving Gateway (SGW), Packet Data Network Gateway (PDN GW), Mobility Management Entity (MME), Serving GPRS Supporting Node (SGSN), and enhanced Packet Data Gateway (ePDG).

The SGW operates as a boundary point between the Radio Access Network (RAN) and the core network and maintains a data path between the eNodeB and the PDN GW. Also, in case the UE moves across serving areas by the eNodeB, the SGW acts as an anchor point for local mobility. In other words, packets can be routed through the SGW to ensure mobility within the E-UTRAN (Evolved-UMTS (Universal Mobile Telecommunications System) Terrestrial Radio Access Network defined for the subsequent versions of the 3GPP release 8). Also, the SGW may act as an anchor point for mobility between the E-UTRAN and other 3GPP networks (the RAN defined before the 3GPP release 8, for example, UTRAN or GERAN (GSM (Global System for Mobile Communication)/EDGE (Enhanced Data rates for Global Evolution) Radio Access Network).

The PDN GW corresponds to a termination point of a data interface to a packet data network. The PDN GW can support policy enforcement features, packet filtering, charging support, and so on. Also, the PDN GW can act as an anchor point for mobility management between the 3GPP network and non-3GPP networks (for example, an unreliable network such as the Interworking Wireless Local Area Network (I-WLAN) or reliable networks such as the Code Division Multiple Access (CDMA) network and Wimax).

In the example of a network structure as shown in FIG. 1, the SGW and the PDN GW are treated as separate gateways; however, the two gateways can be implemented according to single gateway configuration option.

The MME performs signaling for the UE's access to the network, supporting allocation, tracking, paging, roaming, handover of network resources, and so on; and control functions. The MME controls control plane functions related to subscribers and session management. The MME manages a plurality of eNodeBs and performs signaling of the conventional gateway's selection for handover to other 2G/3G networks. Also, the MME performs such functions as security procedures, terminal-to-network session handling, idle terminal location management, and so on.

The SGSN deals with all kinds of packet data including the packet data for mobility management and authentication of the user with respect to other 3GPP networks (for example, the GPRS network).

The ePDG acts as a security node with respect to an unreliable, non-3GPP network (for example, I-WLAN, WiFi hotspot, and so on).

As described with respect to FIG. 1, a UE with the IP capability can access the IP service network (for example, the IMS) that a service provider (namely, an operator) provides, via various components within the EPC based not only on the 3GPP access but also on the non-3GPP access.

Also, FIG. 1 illustrates various reference points (for example, S1-U, S1-MME, and so on). The 3GPP system defines a reference point as a conceptual link which connects two functions defined in disparate functional entities of the E-UTAN and the EPC. Table 1 below summarizes reference points shown in FIG. 1. In addition to the examples of FIG. 1, various other reference points can be defined according to network structures.

TABLE 1

| Reference point | Description |
|---|---|
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS core and the 3GPP anchor function of Serving GW. In addition, if direct tunnel is not established, it provides the user plane tunneling. |
| S5 | It provides user plane tunneling and tunnel management between Serving GW and PDN GW. It is used for Serving GW relocation due to UE mobility if the Serving GW needs to connect to a non-collocated PDN GW for the required PDN connectivity. |
| S11 | Reference point for the control plane protocol between MME and SGW |
| SGi | It is the reference point between the PDN GW and the packet data network. Packet data network may be an operator external public or private packet data network or an intra-operator packet data network (e.g., for provision of IMS services). This reference point corresponds to Gi for 3GPP accesses. |

Among the reference points shown in FIG. 1, S2a and S2b corresponds to non-3GPP interfaces. S2a is a reference point which provides reliable, non-3GPP access, related control between PDN GWs, and mobility resources to the user plane. S2b is a reference point which provides related control and mobility resources to the user plane between ePDG and PDN GW.

FIG. 2 illustrates one example of an Evolved Universal Terrestrial Radio Access Network (E-UTRAN) to which the present invention can be applied.

The E-UTRAN system is an evolved system from the existing UTRAN system; for example, it includes the 3GPP LTE/LTE-A system. The E-UTRAN consists of eNBs providing control plane and user plane protocol to the UE, and the eNBs are connected to each other by means of X2 interface. The X2 user plane interface (X2-U) is defined among the eNBs. The X2-U interface provides non-guaranteed delivery of the user plane Packet Data Unit (PDU). The X2 control plane interface (X2-CP) is defined between two neighboring eNBs. The X2-CP performs the functions of context delivery between eNBs, control of user plane tunnel between a source eNB and a target eNB, delivery of handover-related messages, uplink load management, and so on. The eNB is connected to the UE through a radio interface and is connected to the Evolved Packet Core (EPC) through the S1 interface. The S1 user plane interface (S1-U) is defined between the eNB and the Serving Gateway (S-GW). The S1 control plane interface (S1-MME) is defined between the eNB and the Mobility Management Entity (MME). The S1 interface performs the functions of EPS bearer service management, NAS signaling transport, network sharing, MME load balancing management, and so on. The S1 interface supports many-to-many-relation between the eNB and the MME/S-GW.

FIG. 3 illustrates a radio interface protocol structure between a UE and an E-UTRAN in a wireless communication system to which the present invention can be applied.

FIG. 3(a) illustrates a radio protocol structure for the control plane, and FIG. 3(b) illustrates a radio protocol structure for the user plane.

With reference to FIG. 3, layers of the radio interface protocol between the UE and the E-UTRAN can be divided into a first layer (L1), a second layer (L2), and a third layer (L3) based on the lower three layers of the Open System Interconnection (OSI) model, widely known in the technical field of communication systems. The radio interface protocol between the UE and the E-UTRAN consists of the physical layer, data link layer, and network layer in the horizontal direction, while in the vertical direction, the radio interface protocol consists of the user plane, which is a protocol stack for delivery of data information, and the control plane, which is a protocol stack for delivery of control signals.

The control plane acts as a path through which control messages used for the UE and the network to manage calls are transmitted. The user plane refers to the path through which the data generated in the application layer, for example, voice data, Internet packet data, and so on are transmitted. In what follows, described will be each layer of the control and the user plane of the radio protocol.

The physical layer (PHY), which is the first layer (L1), provides information transfer service to upper layers by using a physical channel. The physical layer is connected to the Medium Access Control (MAC) layer located at the upper level through a transport channel through which data are transmitted between the MAC layer and the physical layer. Transport channels are classified according to how and with which features data are transmitted through the radio interface. And data are transmitted through the physical channel between different physical layers and between the physical layer of a transmitter and the physical layer of a receiver. The physical layer is modulated according to the Orthogonal Frequency Division Multiplexing (OFDM) scheme and employs time and frequency as radio resources.

A few physical control channels are used in the physical layer. The Physical Downlink Control Channel (PDCCH) informs the UE of resource allocation of the Paging Channel (PCH) and the Downlink Shared Channel (DL-SCH); and Hybrid Automatic Repeat reQuest (HARQ) information related to the Uplink Shared Channel (UL-SCH). Also, the PDCCH can carry a UL grant used for informing the UE of resource allocation of uplink transmission. The Physical Control Format Indicator Channel (PCFICH) informs the UE of the number of OFDM symbols used by PDCCHs and is transmitted at each subframe. The Physical HARQ Indicator Channel (PH ICH) carries a HARQ ACK (ACKnowledge)/NACK (Non-ACKnowledge) signal in response to uplink transmission. The Physical Uplink Control Channel (PUCCH) carries uplink control information such as HARQ ACK/NACK with respect to downlink transmission, scheduling request, Channel Quality Indicator (CQI), and so on. The Physical Uplink Shared Channel (PUSCH) carries the UL-SCH.

The MAC layer of the second layer (L2) provides a service to the Radio Link Control (RLC) layer, which is an upper layer thereof, through a logical channel. Also, the MAC layer provides a function of mapping between a logical channel and a transport channel; and multiplexing/demultiplexing a MAC Service Data Unit (SDU) belonging to the logical channel to the transport block, which is provided to a physical channel on the transport channel.

The RLC layer of the second layer (L2) supports reliable data transmission. The function of the RLC layer includes concatenation, segmentation, reassembly of the RLC SDU, and so on. To satisfy varying Quality of Service (QoS) requested by a Radio Bearer (RB), the RLC layer provides three operation modes: Transparent Mode (TM), Unacknowledged Mode (UM), and Acknowledge Mode (AM). The AM RLC provides error correction through Automatic Repeat reQuest (ARQ). Meanwhile, in case the MAC layer performs the RLC function, the RLC layer can be incorporated into the MAC layer as a functional block.

The Packet Data Convergence Protocol (PDCP) layer of the second layer (L2) performs the function of delivering, header compression, ciphering of user data in the user plane, and so on. Header compression refers to the function of reducing the size of the Internet Protocol (IP) packet header which is relatively large and contains unnecessary control to efficiently transmit IP packets such as the IPv4 (Internet Protocol version 4) or IPv6 (Internet Protocol version 6) packets through a radio interface with narrow bandwidth. The function of the PDCP layer in the control plane includes delivering control plane data and ciphering/integrity protection.

The Radio Resource Control (RRC) layer in the lowest part of the third layer (L3) is defined only in the control plane. The RRC layer performs the role of controlling radio resources between the UE and the network. To this purpose, the UE and the network exchange RRC messages through the RRC layer. The RRC layer controls a logical channel, transport channel, and physical channel with respect to configuration, re-configuration, and release of radio bearers. A radio bearer refers to a logical path that the second layer (L2) provides for data transmission between the UE and the network. Configuring a radio bearer indicates that characteristics of a radio protocol layer and channel are defined to provide specific services; and each individual parameter and operating methods thereof are determined. Radio bearers can be divided into Signaling Radio Bearers (SRBs) and Data RBs (DRBs). An SRB is used as a path for transmitting an RRC message in the control plane, while a DRB is used as a path for transmitting user data in the user plane.

The Non-Access Stratum (NAS) layer in the upper of the RRC layer performs the function of session management, mobility management, and so on.

A cell constituting the base station is set to one of 1.25, 2.5, 5, 10, and 20 MHz bandwidth, providing downlink or uplink transmission services to a plurality of UEs. Different cells can be set to different bandwidths.

Downlink transport channels transmitting data from a network to a UE include a Broadcast Channel (BCH) transmitting system information, PCH transmitting paging messages, DL-SCH transmitting user traffic or control messages, and so on. Traffic or a control message of a downlink multi-cast or broadcast service can be transmitted through the DL-SCH or through a separate downlink Multicast Channel (MCH). Meanwhile, uplink transport channels transmitting data from a UE to a network include a Random Access Channel (RACH) transmitting the initial control message and a Uplink Shared Channel (UL-SCH) transmitting user traffic or control messages.

The logical channel is on top of the transport channel and is mapped to the transport channel. The logical channel can be divided into a control channel for delivery of control area information and a traffic channel for delivery of user area information. Examples of the logical channel are a Broadcast Control Channel (BCCH), Paging Control Channel (PCCH), Common Control Channel (CCCH), Dedicated Control Channel (DCCH), Multicast Control Channel (MCCH), Dedicated Traffic Channel (DTCH), and Multicast Traffic Channel (MTCH).

FIG. 4 illustrates an S1 interface protocol structure in a wireless communication system to which the present invention can be applied.

FIG. 4(a) illustrates the control plane protocol stack in the S1 interface, and FIG. 4(b) illustrates the user plane interface protocol structure in the S1 interface.

With reference to FIG. 4, the S1 control plane interface (S1-MME) is defined between the eNB and the MME. Similar to the user plane, the transport network layer is based on IP transmission. However, to ensure reliable transmission of message signaling, the transport network layer is added to the Stream Control Transmission Protocol (SCTP) layer which sits on top of the IP layer. The application layer signaling protocol is called S1 Application Protocol (S1-AP).

The SCTP layer provides guaranteed delivery of application layer messages.

The transport IP layer employs point-to-point transmission for Protocol Data Unit (PDU) signaling transmission.

For each S1-MME interface instance, single SCTP association uses a pair of stream identifiers for the S-MME common procedure. Only part of stream identifier pairs is used for the S1-MME dedicated procedure. The MME communication context identifier is allocated by the MME for the S1-MME dedicated procedure, and the eNB communication context identifier is allocated by the eNB for the S1-MME dedicated procedure. The MME communication context identifier and the eNB communication context identifier are used for identifying a UE-specific S1-MME signaling transmission bearer. The communication context identifier is delivered within each S1-AP message.

In case the S1 signaling transport layer notifies the S1AP layer of disconnection of signaling, the MME changes the state of the UE which has used the corresponding signaling connection to ECM-IDLE state. And the eNB releases RRC connection of the corresponding UE.

The S1 user plane interface (S1-U) is defined between eNB and S-GW. The S1-U interface provides non-guaranteed delivery of the user plane PDU between the eNB and the S-GW. The transport network layer is based on IP transmission, and the GPRS Tunneling Protocol User Plane (GTP-U) layer is used on top of the UDP/IP layer to deliver the user plane PDU between the eNB and the S-GW.

EMM and ECM State

In what follows, EPS Mobility Management (EMM) and EPS Connection Management (ECM) states will be described.

FIG. 5 illustrates an EMM and ECM states in a wireless communication system to which the present invention can be applied.

With reference to FIG. 5, to manage mobility of the UE in the NAS layer defined in the control planes of the UE and the MME, EMM-REGISTERED and EMM-DEREGISTERED states can be defined according to the UE is attached to or detached from a network. The EMM-REGISTERED and the EMM-DEREGISTERED states can be applied to the UE and the MME.

Initially, the UE stays in the EMM-DEREGISTERED state as when the UE is first powered on and performs registering to a network through an initial attach procedure to connect to the network. If the connection procedure is performed successfully, the UE and the MME makes transition to the EMM-REGISTERED state. Also, in case the UE is powered off or the UE fails to establish a radio link (namely, a packet error rate for a radio link exceeds a reference value), the UE is detached from the network and makes a transition to the EMM-DEREGISTERED state.

Similarly, to manage signaling connection between the UE and the network, ECM-CONNECTED and ECM-IDLE states can be defined. The ECM-CONNECTED and ECM- IDLE states can also be applied to the UE and the MME. ECM connection consists of RRC connection formed between the UE and the eNB; and S1 signaling connection formed between the eNB and the MME. In other words, establishing/releasing an ECM connection indicates that both of the RRC connection and S1 signaling connection have been established/released.

The RRC state indicates whether the RRC layer of the UE is logically connected to the RRC layer of the eNB. In other words, in case the RRC layer of the UE is connected to the RRC layer of the eNB, the UE stays in the RRC_CONNECTED state. If the RRC layer of the UE is not connected to the RRC layer of the eNB, the UE stays in the RRC_IDLE state.

The network can identify the UE staying in the ECM-CONNECTED state at the level of cell unit and can control the UE in an effective manner.

On the other hand, the network is unable to know the existence of the UE staying in the ECM-IDLE state, and a Core Network (CN) manages the UE on the basis of a tracking area unit which is an area unit larger than the cell. While the UE stays in the ECM-IDLE state, the UE performs Discontinuous Reception (DRX) that the NAS has configured by using the ID allocated uniquely in the tracking area. In other words, the UE can receive a broadcast signal of system information and paging information by monitoring a paging signal at a specific paging occasion for each UE-specific paging DRX cycle.

When the UE is in the ECM-IDLE state, the network does not carry context information of the UE. Therefore, the UE staying in the ECM-IDLE state can perform a mobility-related procedure based on the UE such as cell selection or cell reselection without necessarily following an order of the network. In case the position of the UE differs from the position recognized by the network while the UE is in the ECM-IDLE state, the UE can inform the network of the corresponding position of the UE through a Tracking Area Update (TAU) procedure.

On the other hand, when the UE is in the ECM-CONNECTED state, mobility of the UE is managed by an order of the network. While the UE stays in the ECM-CONNECTED state, the network knows to which cell the UE currently belongs. Therefore, the network can transit and/or receiver data to or from the UE, control mobility of the UE such as handover, and perform cell measurement with respect to neighboring cells.

As described above, the UE has to make a transition to the ECM-CONNECTED state in order to receive a general mobile communication service such as a voice or data communication service. As when the UE is first powered on, the UE in its initial state stays in the ECM-IDLE state as in the EMM state, and if the UE successfully registers to the corresponding network through an initial attach procedure, the UE and the MEE make a transition to the ECM connection state. Also, in case the UE has already registered to the network but radio resources are not allocated as traffic is not activated, the UE stays in the ECM-IDLE state, and if new uplink or downlink traffic is generated for the corresponding UE, the UE and the MME make a transition to the ECM-CONNECTED state through a Service Request procedure.

FIG. 6 illustrates a bearer structure in a wireless communication system to which the present invention can be applied.

When the UE is connected to a Packet Data Network (PDN) (which is the peer entity of FIG. 6), PDN connection is established, which can be called an EPS session. The PDN provides a service function such as the Internet or IP Multimedia Subsystem (IMS) through an external or internal IP network of the service provider.

An EPS session comprises one or more EPS bearers. The EPS bearer refers to the transmission path of traffic generated between the UE and the PDN GW for the EPS to deliver user traffic. One or more EPS bearers can be set up for each UE.

Each EPS bearer can be classified into E-UTRAN Radio Access Bearer (E-RAB) or S5/S8 bearer, and the E-RAB can be further divided into a Radio Bearer (RB) and S1 bearer. In other words, one EPS bearer corresponds to one RB, one S1 bearer, and one S5/S8 bearer.

The E-RAB delivers packets of the EPS bearer between the UE and the EPC. If an E-RAB is generated, the E-RAB bearer is one-to-one mapped to the EPS bearer. A Data Radio Bearer (DRB) delivers packets of the EPS bearer between the UE and the eNB. If a DRB is generated, it is one-to-one mapped to the EPS bearer/E-RAB. The S1 bearer delivers packets of the EPS bearer between the eNB and the S-GW. The S5/S8 bearer delivers EPS bearer packets between the S-GW and the P-GW.

The UE binds the EPS bearer in the uplink direction with a Service Data Flow (SDF). An SDF is a group of IP flow(s) obtained by classifying (or filtering) user traffic according to individual services. A plurality of SDFs can be multiplexed to the same EPS bearer by including a plurality of uplink packet filters. The UE stores mapping information between the uplink packet filter and the DRB to bind the SDF and the DRB with each other for uplink transmission.

The P-GW binds the SDF with the EPS bearer in the downlink direction. A plurality of SDFs can be multiplexed to the same EPS bearer by including a plurality of downlink packet filters. The P-GW stores mapping information between the downlink packet filter and the S5/S8 bearer to bind the SDF and the S5/S8 bearer with each other for downlink transmission.

The eNB stores one-to-one mapping information between the DRB and the S1 bearer to bind the DRB and the S1 bearer with each other. The S-GW stores one-to-one mapping information between the S1 bearer and the S5/S8 bearer to bind the S1 bearer and the S5/S8 bearer with each other for uplink/downlink transmission.

The EPS bearer can be one of two types: a default bearer and a dedicated bearer. The UE can have one default bearer and one or more dedicated bearers for each PDN. The minimum basic bearer that the EPS session can have with respect to one PDN is called default bearer.

The EPS bearer can be classified on the basis of its identity. The EPS bearer identity is allocated by the UE or the MME. The dedicated bearer(s) is combined with the default bearer by a Linked EPS Bearer Identity (LBI).

If the UE establishes an initial connection to the network through an initial attach procedure, an IP address is allocated to the UE to generate a PDN connection, and a default bearer is generated in the EPS interval. Unless the UE terminates the PDN connection, the default bearer is not released but maintained even when there is no traffic between the UE and the corresponding PDN; the default bearer is released when the corresponding PDN connection is terminated. At this time, not all the bearers acting as default bearers with respect to the UE across the whole interval are not activated; the S5 bearer connected directly to the PDN is maintained, and the E-RAB bearer related to radio resources (namely, DRB and S1 bearer) is released. And if new traffic is generated in the corresponding PDN, the E-RAB bearer is reconfigured to deliver traffic.

If the UE attempts to use a service of which the Quality of Service (QoS) (for example, Video on Demand (VoD) service) cannot be supported by the default bearer while using a service (for example, the Internet) through the default bearer, a dedicated bearer is created when the UE demands the high QoS service. In case there is no traffic from the UE, the dedicated bearer is released. The UE or the network can create a plurality of dedicated bearers depending on needs.

Depending on which service the UE uses, the IP flow can have different QoS characteristics. When the EPS session for the UE is established or modified, the network allocates network resources; or determines a control policy about QoS and applies the policy while the EPS session is maintained. The aforementioned operation is called Policy and Charging Control (PCC). A PCC rule is determined based on the operation policy (for example, a QoS policy, gate status, and charging method).

The PCC rule is determined in SDF unit. In other words, according to the service that the UE uses, the IP flow can have different QoS characteristics, IP flows having the same QoS are mapped to the same SDF, and the SDF becomes the unit by which the PCC rule is applied.

Main entities which perform the PCC function include a Policy and Charging Rules Function (PCRF) and Policy and Charging Enforcement Function (PCEF).

The PCRF determines a PCC rule for each SDF when the EPS session is established or modified and provides the PCC rule to the P-GW (or PCEF). After determining a PCC rule for the corresponding SDF, the P-GW detects the SDF for each IP packet transmitted or received and applies the PCC rule relevant to the corresponding SDF. When the SDF is transmitted to the UE via the EPS, the SDF is mapped to the EPS bearer capable of providing appropriate QoS according to the QoS rule stored in the P-GW.

PCC rules can be classified by dynamic PCC rules and pre-defined PCC rules. A dynamic PCC rule is provided dynamically from the PCRF to the P-GW when the EPS session is established or modified. On the other hand, a pre-defined PCC rule is predefined in the P-GW and activated/deactivated by the PCRF.

The EPS bearer includes a QoS Class Identifier (QCI) and Allocation and Retention Priority (ARP) as basic QoS parameters.

A QCI is a scalar used as a reference for accessing node-specific parameters which control bearer level packet forwarding treatment, where the scalar value is pre-configured by a network operator. For example, the scalar can be pre-configured by one of integer values ranging from 1 to 9.

The main purpose of the ARP is to determine whether a request for an establishment or modification of a bearer can be accepted or refused when only limited amount of resources are available. Also, the ARP can be used for the eNB to determine which bearer(s) to drop under the situation of limited resources (for example, handover).

EPS bearers can be classified to Guaranteed Bit Rate (GBR)-type bearers and non-GBR type bearers depending on QCI resource type. A default bearer is always a non-GBR type bearer, but a dedicated bearer can be a GBR or non-GBR type bearer.

A GBR-type bearer has GBR and Maximum Bit Rate (MBR) as QoS parameters in addition to the QCI and the ARP. The MBR indicates that fixed resources are allocated (bandwidth is guaranteed) for each bearer. On the other hand, a non-GBR type bearer has an Aggregated MBR (AMBR) as a QoS parameter in addition to the QCI and the ARP. The AMBR indicates that instead of allocating resources to individual bearers, maximum bandwidth is allocated, where other non-GBR type bearers can be used together.

As described above, if QoS of the EPS bearer is determined, QoS of each bearer is determined for each interface. Since the bearer of each interface provides QoS of the EPS bearer according to the interface, the EPS bearer, RB, and S1 bearer all have a one-to-one relationship among them.

If the UE attempts to use a service of which the QoS cannot be supported by the default bearer while using a service through the default bearer, a dedicated bearer is created.

FIG. 7 illustrates transmission paths of a control plane and a user plane in an EMM registration state in a wireless communication system to which the present invention can be applied.

FIG. 7(a) illustrates ECM-CONNECTED state, and FIG. 7(b) illustrates ECM-IDLE state.

If the UE successfully attaches to the network and enters the EMM-Registered state, the UE receives a service by using an EPS bearer. As described above, the EPS bearer is divided into the DRB, S1 bearer, and S5 bearer according to the respective intervals.

As shown in FIG. 7(a), in the ECM-CONNECTED state where user traffic is present, NAS signaling connection, namely, ECM connection (RRC connection and S1 signaling connection) is established. Also, S11 GTP-C (GPRS Tunneling Protocol Control Plane) connection is established between the MME and the SGW, and S5 GTP-C connection is established between the SGW and the PDN GW.

Also, in the ECM-CONNECTED state, all of the DRB, S1 bearer, and S5 bearer are set up (namely, radio or network resources are allocated).

As shown in FIG. 7(b), in the ECM-IDLE state where there is no user traffic, the ECM connection (namely, RRC connection and S1 signaling connection) is released. However, the S11 GTP-C connection between the MME and the SGW; and the S5 GTP-C connection between the SGW and the PDN GW are retained.

Also, in the ECM-IDLE state, the DRB and the S1 bearer are all released, but the S5 bearer is retained (namely, radio or network resources are allocated).

FIG. 8 is a view exemplifying an ECM connection establishment procedure in a wireless communication system to which the present invention can be applied.

Referring to FIG. 10, a UE transmits a RRC connection request message to an eNB for requesting RRC connection (step, S801).

The RRC connection request message includes a UE Identity (e.g., SAE temporary mobile subscriber identity (S-TMSI) or random ID) and an establishment cause.

The establishment cause may be determined according to NAS procedure (e.g., attach, detach, tracking area update, service request and extended service request).

The eNB transmits a RRC connection setup message to the UE in response to the RRC connection request message (step, S802).

After receiving the RRC connection setup message, the UE is shifted to RRC_CONNECTED mode.

The UE transmits a RRC connection setup complete message to the eNB for verifying successful completion of the RRC connection establishment (step, S803).

The UE transmits the RRC connection setup complete message with NAS message (e.g., initial attach message, service request message, etc.) being included to the eNB.

The eNB acquires the service request message from the RRC connection setup complete message, and transmits this to the MME through the Initial UE message, which is S1AP message (step, S804).

The control signals between the eNB and the MME may be delivered through S1AP message with S1-MME interface. The S1AP message is delivered through S1 signaling connection for each user, and the S1 signaling connection is defined by an identity pair (i.e., eNB UE S1AP ID and MME UE S1AP ID) such that the eNB and the MME distinguish the UE.

The eNB allocates eNB UE S1AP ID and transmits the Initial UE message including the eNB UE S1AP ID to MME, and the MME receives the Initial UE message and setup S1 signaling connection between the eNB and the MME by allocating MME S1AP UE ID.

System Information

A UE synchronizes with a cell through the cell discovery procedure, and acquires the physical layer ID of the cell and cell radio frame timing. And, when the UE complete such a procedure successfully, the UE should acquire the cell system information. Generally, the system information means the information that the UE should know in order to access a cell and to properly operate in a network or a specific cell.

The detailed features in relation to the system information may be incorporated by reference to the document 3GPP TS 36.331.

In the LTE/LTE-A system, the basic parameters (e.g., the system information) required for the operation of the UE in the RRC_IDLE mode and the RRC_CONNECTED mode are broadcasted by dividing the parameters into several information blocks.

The system information may be divided into a Master Information Block (MIB) and a plurality of System Information Blocks (SIBs). Hereinafter, the SIB type x (System InformationBlockTypex) is simply referred to as 'SIB x'.

Table 2 briefly illustrates the contents included in the system information.

TABLE 2

| System Information | Content |
| --- | --- |
| Master Information Block | Downlink channel bandwidth, PHICH configuration, SFN |
| System Information Block 1 | PLMN ID, tracking area code, cell selection parameters, frequency band, cell barring, other SIB scheduling information |
| System Information Block 2 | Access class barring, RACH, BCCH, PCCH, PRACH, PDSCH, PUSCH, PUCCH parameter, UE timers and constants, uplink carrier frequency |
| System Information Block 3 | cell reselection parameters |
| System Information Block 4 | Intra-frequency neighboring cell information for cell reselection |
| System Information Block 5 | Inter-frequency neighboring cell information for cell reselection |
| System Information Block 6 | UMTS neighboring cell information for cell reselection |
| System Information Block 7 | GERAN neighboring cell information for cell reselection |
| System Information Block 8 | CDMA2000 neighboring cell information for cell reselection |
| System Information Block 9 | Home eNB name |
| System Information Block 10 | ETWS(Earthquake and Tsunami Warning System) primary notification |
| System Information Block 11 | ETWS(Earthquake and Tsunami Warning System) secondary notification |

TABLE 2-continued

| System Information | Content |
| --- | --- |
| System Information Block 12 | CMAS(Commercial Mobile Alert System) warning notification |
| System Information Block 13 | MBMS(Multimedia Broadcast Multicast Service)-related information |
| System Information Block 14 | EAB(Extended Access Barring) for access control |
| System Information Block 15 | information related to mobility procedures for MBMS reception |
| System Information Block 16 | information related to GPS(Global Positioning System) time and UTC(Coordinated Universal Time) |

Referring to Table 2, the MIB includes the parameter that is the most essential, limited and required for obtaining other information from a cell and the most frequently transmitted.

The MIB includes the information for a DL cell bandwidth. In the MIB, 4 bits are used for indicating the DL bandwidth, and may indicate different bandwidths up to 16.

In addition, the MIB includes the information of the PHICH configuration of a cell. A UE should know the PHICH configuration in order to receive the L1/L2 control signaling on the PDCCH which is required for receiving a DL-SCH (i.e., the PDSCH). In the MIB, 3 bits indicate the information of the PHICH configuration; herein, 1 bit represents whether the PHICH duration occupies one OFDM symbol or three OFDM symbols, and the remaining 2 bits notify the amount of reserved resource for the PHICH in the control region.

In addition, the MIB includes the system frame number (SFN) of the radio frame on which the corresponding MIB is transmitted.

SIB 1 includes the information in relation to a cell access (a PLMN ID, a tracking area code, a cell selection parameter and a frequency band), and particularly, includes the scheduling information of other SIBs except SIB 1.

In addition, each of the system information is provided to a UE by being distinguished into information blocks.

The SIB numbers, the contents included in each SIB, and the like that are illustrated in Table 2 are just an example, but the present invention is not limited thereto.

FIG. 9 exemplifies a transmission of the system information in a wireless communication system to which the present invention can be applied.

Referring to FIG. 9, the MIB uses the fixed schedule that has the period of 40 ms, and is repeated within the period of 40 ms. The first transmission of the MIB is scheduled in subframe #0 of the radio frame of which System Frame Number (SFN) mod 4=0, and repeated in subframe #0 of all of other radio frames within the period of 40 ms.

SIB 1 uses a fixed schedule that has a 80 ms period and is repeated within the 80 ms period. The first transmission of SIB 1 is scheduled in subframe #5 of the radio frame of which SFN mod 8=0, and repeated in subframe #5 of all of other radio frames of which SFN mod 2=0 within the 80 ms period.

A network may provide SIB 1 that includes the same parameter value through the dedicated signaling (e.g., RRC Connection Reconfiguration message) as well as broadcasts the SIB.

The SIBs except SIB 1 is delivered in the system information (SI) message.

The mapping in the SI message of the SIB may be configured by the scheduling information list (schedulingInfoList) included in SIB 1. The scheduling information list (schedulingInfoList) includes the scheduling information (schedulingInfo) of each SI message, and the scheduling information (schedulingInfo) includes the transmission period (si-Periodicity) of the SI message and the SIB mapping information (sib-MappingInfor).

In this case, each SIB is included only in a single SI message and once in the corresponding SI message. The SIBs including the same scheduling requirement (e.g., transmission period) may be mapped to the same SI message. SIB 2 (SystemInformationBlockType2) is always mapped to the SI message that corresponds to the first message in the list of the SI messages in the scheduling information list. The multiple SI messages are transmitted in the same period.

The SI message is transmitted in the window in a time domain (hereinafter, referred to as 'SI window') using a dynamic scheduling. SIB 1 configures a SI window length (si-WindowLength).

Each SI message is in relation to a single SI window, and the SI windows of different SI messages are not overlapped. That is, only one SI message is transmitted in a single SI window.

The length of the SI window is the same for all SI messages. In the SI window, the corresponding SI message may be transmitted several times in the radio frame of MBSFN subframe, UL subframe in TDD and the subframe except subframe #5 of radio frames of which SFN mod 2=0.

The system information is commonly applied to all UEs accessed in a cell, and a UE should maintain the newest system information always for the proper operation. In the case that the system information is changed, a UE should know the time when an eNB transmits new system information.

As described above, in order to notify that the system information is changed or in order to trigger a UE so as to reacquire the system information, a paging message may be used.

The change of the system information (except the ETWS, CMAS and EAB parameters) occurs only in a specific radio frame. That is, a modification period is used. The system information is transmitted several times with the same contents within the modification period. The boundary of the modification period is defined as the SFN value, SFN mod=0. Herein, m is a radio frame number that configures the modification period. The modification period is configured by the system information.

FIG. 10 is a view illustrating the modification of the system information in a wireless communication system to which the present invention can be applied.

When a network modifies (a part of) the system information, the modification is notified to the first UE. That is, the modification is performed within a modification period. In the next modification period, the network transmits updated system information. The different shades in FIG. 10 represent different types of system information. In the case of receiving the modification notification, a UE acquires new system information immediately after the next modification period is started. The UE applies the system information which is previously acquired until acquiring new system information.

A paging message is used in order to notify the modification of the system information to the UE in the RRC_IDLE mode and the UE in the RRC_CONNECTED mode. When the UE receives a paging message that includes a system information modification (systemInfoModification) field, the UE knows that the system information is to be changed in a boundary of the next modification period. However, even though the UE receives the information of the modification within the system information, any further detailed information such as which system information is changed is not provided to the UE.

SIB 1 includes a system information value tag (systemInfoValueTag) indicating that a modification is occurred in the SI message. The UE may use the system information value tag in order to check whether the SI message which is previously stored is still valid (e.g., the case of returning to coverage from exterior, etc.). In addition, the UE may regard the system information as not valid in the case that three hours have passed since the time when the UE successfully checks the system information stored is valid.

When a part of the system information (e.g., the parameter (SIB 8 and SIB 16) which is regularly changed such as the ETWS information, the CMAS information and the time information, and the EAB parameter) is changed, the network may not update the system information value tag. Similarly, when a part of the system information is changed, the network may not include a system information modification (systemInfoModification) field within a paging message.

In the case that the systemInfoValueTag in SIB 1 is checked after the modification period boundary is passed or a paging is not received, by trying to find a system information modification (systemInfoModification) indication as much as at least a modificationPeriodCoeff number (e.g., 2, 4, 8 and 16) during the modification period in every modification period, the UE may check the stored system information to be valid.

In the case that the UE fails to receive the paging message during the modification period, the UE may assume that the system information will not be changed in the next modification period boundary. When the UE in the RRC_CONNECTED mode receives a paging message during the modification period, the UE may determine whether the system information except the ETWS information, the CMAS information and the EAB parameter is going to be modified in the next modification period according to the presence of the system information modification (systemInfoModification).

The UE in the RRC_CONNCTED mode which is available to support the ETWS and/or the CMAS tries to read the paging at least once in every default paging cycle (defaultPagingCycle) in order to check whether the ETWS and/or CMAS notification is existed.

Hereinafter, the modification notification of the ETWS, CMAS and EAB parameters will be described in more detail.

The ETWS primary notification and/or the ETWS secondary notification may be occurred in any times. The paging message may be used in order to notify whether the ETWS primary notification and/or the ETWS secondary notification are existed to the UEs in the RRC_IDLE mode and the RRC_CONNCTED mode which are available to support the ETWS.

When the UE receives the paging message that includes an ETWS indication, the UE starts to receive the ETWS primary notification and/or the ETWS secondary notification according to the scheduling information list (schedulingInfoList) included in SIB 1.

In the case that the UE receives the paging message that includes an ETWS indication during acquiring the ETWS notification(s), the UE continues acquiring the ETWS notification(s) according to the scheduling information list (schedulingInfoList) which is previously acquired until reacquiring the scheduling information list (schedulingInfoList) in SIB 1.

The UE is not required to check periodically the scheduling information list (schedulingInfoList) included in SIB 1. However, when receiving the paging message that includes the ETWS indication, the UE reacquires the scheduling information list (schedulingInfoList) included in SIB 1 in order to check the scheduling modification for SIB 10 and SIB 11.

In the case that the ETWS is no more scheduled, the UE may receive the paging message that includes the ETWS indication and/or the system information modification (system InfoModification), or may not receive it.

The ETWS primary notification is included in SIB 10, and the ETWS secondary notification is included in SIB 11. The ETWS secondary notification may be delivered with being segmented. The segmentation which is applied to a transmission of the ETWS secondary notification in a cell is fixed. That is, the ETWS secondary notification has the same segmentation size that includes the same message identifier (messageIdentifier), serial number (serialNumber) and warning message segment number (warningMessageSegmentNumber). The ETWS secondary notification corresponds to a single cell broadcasting (CB) data. This will be described in detail below.

The CMAS notification may be occurred in any times. The paging message may be used in order to notify whether the one or more CMAS notifications are existed to the UEs in the RRC_IDLE mode and the RRC_CONNCTED mode which are available to support the CMAS.

When the UE receives the paging message that includes a CMAS indication, the UE starts to receive the CMAS notification according to the scheduling information list (schedulingInfoList) included in SIB 1.

In the case that the UE receives the paging message that includes an CMAS indication during acquiring the CMAS notification(s), the UE continues acquiring the CMAS notification(s) according to the scheduling information list (schedulingInfoList) which is previously acquired until reacquiring the scheduling information list (schedulingInfoList) in SIB 1.

The UE is not required to check periodically the scheduling information list (schedulingInfoList) included in SIB 1. However, when receiving the paging message that includes the CMAS indication, the UE reacquires the scheduling information list (schedulingInfoList) included in SIB 1 in order to check the scheduling modification for SIB 12.

In the case that SIB 12 is no more scheduled, the UE may receive the paging message that includes the ETWS indication and/or the system information modification (system InfoModification), or may not receive it.

The CMAS notification is included in SIB 12. The CMAS notification may be delivered with being segmented. The segmentation which is applied to the transmission of the CMAS notification in a cell is fixed. That is, the CMAS notification has the same segmentation size that includes the same message identifier (messageIdentifier), serial number (serialNumber) and warning message segment number (warningMessageSegmentNumber). The network does not apply the interleaving in the transmission of the CMAS notification. That is, all segments of the CMAS notification is transmitted before the segment of another CMAS notification. The CMAS notification corresponds to a single cell broadcasting (CB) data. This will be described in detail below.

The EAB parameter modification may be occurred in any times. The EAB parameter is included in SIB 14. The paging message may be used in order to notify that the modification of the EAB parameter or SIB 14 is no more scheduled to the UE in the RRC_IDLE mode which is available to support the EAB.

When the UE receives the paging message that includes the EAB parameter modification (eab-ParamModification), the UE starts to receive SIB 14 according to the scheduling information list (schedulingInfoList) included in SIB 1.

In the case that the UE receives the paging message that includes the EAB parameter modification (eab-ParamModification) during acquiring SIB 14, the UE continues acquiring SIB 14 according to the scheduling information list (schedulingInfoList) which is previously acquired until reacquiring the scheduling information list (schedulingInfoList) included in SIB 1.

FIG. 11 is a view illustrating a system information acquisition procedure in a wireless communication system to which the present invention can be applied.

A UE uses the system information acquisition procedure in order to acquire the access stratum (AS) and non-access stratum (NAS) system information which is broadcasted by a network. The system information acquisition procedure is applied to both of the UE in the RRC_IDLE mode and the UE in the RRC_CONNECTED mode.

The UE starts the system information acquisition procedure when completing a cell selection (e.g., when turning on the UE), a cell reselection and handover, when entering another Radio Access Technology (RAT), when entering in the coverage from exterior, when receiving a notification indicating that the system information is modified, when receiving an indication that an ETWS notification is existed, when receiving an indication that a CMAS notification is existed, when receiving an indication that an EAB parameter is modified and when a maximum validity duration is elapsed.

Referring to FIG. 10, the UE receives the MIB from the network (step, S1101).

The MIB is mapped to the BCCH and transmitted in the BCH/PBCH. As described above, the MIB is scheduled in subframe #0 of the radio frame of which SFN mod 4=0, and which is repeated in subframe #0 of all other radio frames in the corresponding period. And, the PBCH occupies 72 subcarriers on the center of first four OFDM symbols in the second slot of subframe #0 of a radio frame.

The UE receives SIB 1 from the network using the parameter received from the MIB (step, S1102). And, the UE receives the system information of the network based on the scheduling information list (schedulingInfoList) acquired from SIB 1 (step, S1103).

SIB 1 is scheduled in subframe #5 of the radio frame of which SFN mod 8=0, and which is repeated in subframe #5 of all other radio frames of which SFN mod 2=2 within 80 ms period.

On the other hand, the remaining SIB except SIB 1 is transmitted by being mapped to the SI for each SIB that has the same transmission period. As described above, the SI window length and the SI message transmission period are scheduled in SIB 1.

All SIBs are mapped to the BCCH and transmitted in the DL-SCH/PDSCH. The PDCCH for the SIB delivers the DCI to which the CRC scrambled by the system information-RNTI (SI-RNTI) is attached, and identifies the PDSCH that delivers the SIB from the PDCCH. The PDSCH resource allocation information for the SIB uses DCI formats 1A and 10. That is, DCI formats 1A and 10 are scrambled by the SI-RNTI.

The UE may acquire the detailed time domain scheduling (and other information, for example, frequency domain scheduling, a transmission format which is used, etc.) of the PDSCH that delivers the SI message by decoding the SI-RNTI on the PDCCH. One SI-RNTI is used for addressing all SI messages not only SIB 1.

The UE may overwrite the system information acquired through the system information acquisition procedure on the system information which is already stored.

Paging

The paging procedure is used in order to transmit paging information to a UE in RRC_IDLE mode in network, or to notify change of system information to a UE in RRC_IDLE/RRC_CONNECTED mode, or to notify ETWS primary notification and/or ETWS secondary notification to all UEs in RRC_IDLE/RRC_CONNECTED mode, or to notify CMAS notification to a UE in RRC_IDLE/RRC_CONNECTED mode.

FIG. 12 is a view exemplifying a paging procedure in a wireless communication system to which the present invention can be applied.

Referring to FIG. 12, an MME starts a paging procedure by transmitting a paging message to an eNB (step, S1201).

As described above, locations of UE in ECM-IDLE state is managed in the MME based on Tracking Area (TA). At the moment, since the UE may be registered by one or more TAs, the MME may transmit a paging message to a plurality of eNBs that cover the cell belonged to the TA(s) where the UE is registered. Here, each cell may be belonged to only one TA, and each eNB may include cells belonged to different TAs.

Herein, the MME transmits a paging message to each eNB through S1AP interface. Hereinafter, this may be referred to 'S1AP paging message'.

Table 3 exemplifies the S1AP paging message.

OCTET STRING, etc.), and in case that a range of a value that the corresponding IE may have is existed, represents the range of the value.

The Criticality field represents criticality information that is applied to an IE/IE group. The criticality information means information indicating how a reception terminal operates in case that the reception terminal does not understand all or a part of the IE/IE group. The sign, '-', represents that the criticality information is not applied, and the sign 'YES' represents the criticality information is applied. 'GLOBAL' represents that an IE and repeated IE have one piece of common criticality information. 'EACH' represents that each of repeated IE has unique criticality information. Assigned Criticality field represents actual criticality information.

The information element (IE) or IE group included in the S1AP paging message will be described in more detail below.

Message type IE distinguishes a message which is transmitted.

UE Identity Index value IE is used for an eNB to calculate Paging Frame (PF) (e.g., UE Identity Index=UE IMSI mod 1024).

UE paging identity IE is an identity for distinguishing a UE which is paged, and is indicated by one of IMSI and SAE temporary mobile subscriber identity (S-TMSI). The S-TMSI means an identity that is available to uniquely distinguish a UE among one MME group.

In case that a UE uses a UE-specific DRX cycle length, Paging DRX IE is used to calculate paging frame (PF) for an eNB. The UE may specify the DRX cycle length in the attach request message or tracking area update (TAU) message.

CN Domain IE indicates whether the paging is generated in circuit switched (CS) domain or packet switched (PS) domain.

TABLE 3

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| UE Identity Index value | M | | 9.2.3.10 | | YES | ignore |
| UE Paging Identity | M | | 9.2.3.13 | | YES | ignore |
| Paging DRX | O | | 9.2.1.16 | | YES | ignore |
| CN Domain | M | | 9.2.3.22 | | YES | ignore |
| List of TAIs | | 1 | | | YES | ignore |
| >TAI List Item | | 1 ... <maxnoofTAIs> | | | EACH | ignore |
| >>TAI | M | | 9.2.3.16 | | — | |
| CSG Id List | | 0 ... 1 | | | GLOBAL | ignore |
| >CSG Id | | 1 ... <maxnoofCSGId> | 9.2.1.62 | | — | |
| Paging Priority | O | | 9.2.1.78 | | YES | ignore |

Referring to Table 2, IE/Group Name represents a name of an information element (IE) or an IE group. 'M' in the Presence field is a mandatory IE, and represents an IE/IE group included in a message always. 'O' is an optional IE and represents an IE/IE group included or may not be included in a message. 'C' is a conditional IE and represents an IE/IE group included in a message only when a specific condition is satisfied. The Range field represents a number of which repeated IEs/IE groups is available to be repeated.

The IE type and reference field represents a type of the corresponding IE (e.g., ENUMERATED, INTEGER, Tracking Area Identity (TAI) List IE is used to notify a TA in which a paging message should be broadcasted to an eNB. The TAI means an identity which is used to uniquely distinguish TA.

Closed Subscriber Group (CSG) ID List IE represents a CSG set where a UE is prescribed. This prevents an eNB from paging to a UE in a CSG cell where the UE is not prescribed.

The eNB that receives S1AP paging message from the MME configures a paging message (hereinafter, referred to 'RRC paging message').

Table 4 exemplifies a RRC paging message.

TABLE 4

```
-- ASN1START
Paging ::=                      SEQUENCE {
    pagingRecordList                PagingRecordList                OPTIONAL, -- Need ON
    systemInfoModification          ENUMERATED {true}               OPTIONAL, -- Need ON
    etws-Indication                        ENUMERATED {true}        OPTIONAL, -- Need ON
    nonCriticalExtension            Paging-v890-IEs                 OPTIONAL  -- Need OP
}
Paging-v890-IEs ::=             SEQUENCE {
    lateNonCriticalExtension        OCTET STRING                    OPTIONAL, -- Need OP
    nonCriticalExtension            Paging-v920-IEs                 OPTIONAL  -- Need OP
}
Paging-v920-IEs ::=             SEQUENCE {
    cmas-Indication-r9              ENUMERATED {true}               OPTIONAL, -- Need ON
    nonCriticalExtension                   Paging-v1130-IEs         OPTIONAL  -- Need OP
}
Paging-v1130-IEs ::=            SEQUENCE {
    eab-ParamModification-r11       ENUMERATED {true}               OPTIONAL, -- Need ON
    nonCriticalExtension            SEQUENCE { }                    OPTIONAL  -- Need OP
}
PagingRecordList ::=            SEQUENCE (SIZE (1..maxPageRec)) OF PagingRecord
PagingRecord ::=                SEQUENCE {
    ue-Identity                             PagingUE-Identity,
    en-Domain                       ENUMERATED {ps, cs},
    ...
}
PagingUE-Identity ::=           CHOICE {
    s-TMSI                                  S-TMSI,
    imsi                            IMSI,
    ...
}
IMSI ::=                        SEQUENCE (SIZE (6..21)) OF IMSI-Digit
IMSI-Digit ::=                      INTEGER (0..9)
-- ASN1STOP
```

Referring to Table 4, a single RRC paging message of UE may carry information of multiple S1AP paging messages. That is, the RRC paging message may include multiple paging records (e.g., 16) for paging multiple UEs.

Each paging record includes a UE-Identity field and a CN domain field. This is a content which is transmitted from a S1AP paging message.

The system InfoModification field is not delivered from the S1AP paging message, but is generated by an eNB. This field is used for triggering such that a UE re-acquires a system information block (SIB) set.

The Extended Access Barring (EAB)-ParamModification field is used to indicate change of EAB parameter (SIB 14).

The ETWS-Indication field is not delivered from the S1AP paging message, but is generated by an eNB. This field is applied only to an ETWS capable UE, and is used to trigger such that the corresponding UE re-acquires SIB 1. The SIB 1 content indicates ETWS content in SIB 10 and SIB 11 to a UE.

The CMAS-Indication field is applied only to a CMAS capable UE, and is used to trigger such that the corresponding UE re-acquires SIB 1. The SIB 1 content indicates CMAS content in SIB 12 to a UE.

As such, the eNB that configures the RRC paging message transmits downlink control information (DCI) to which cyclic redundancy check (CRC) scrambled with paging-RNTI (P-RNTI) is attached to a UE on the PDCCH (step, S1202), and transmits the RRC paging message to the UE on the PDSCH (step, S1203).

That is, an eNB delivers the RRC paging message through the PCCH logical channel, the PCH transport channel and the PDSCH physical channel to a UE.

In more detail, the eNB determines a PDCCH format according to the DCI that will be sent to the UE, and attaches CRC to the DCI. According to the owner or use of the PDCCH, a unique radio network temporary identifier (RNTI) is scrambled (or masked) to CRC. For the PDCCH for a specific UE, a unique identity of UE (e.g., cell-RNTI; C-RNTI) may be masked to CRC. Or, for the PDCCH for a paging message, a paging indication identity (e.g., paging-RNTI; P-RNTI) may be masked to CRC.

That is, a UE monitors the PDCCH based on P-RNTI in a subframe belonged to its paging occasion 1212. And in order to detect the PDCCH masked by P-RNTI, the UE decodes the DCI transmitted on the PDCCH. The DCI indicates the PDSCH resource where the paging message is transmitted. And the UE decodes the RRC paging message from the PDSCH resource indicated in the DCI.

The paging cycle 1213 may be determined in a cell-specific manner, or determined in a UE-specific manner. In addition, the paging occasion 1212 is determined based on its paging cycle 1213 and its identity (i.e., IMSI) for each UE. Accordingly, the paging message is not transmitted to all UEs on an available paging occasion 1211 from an eNB, but the paging message is transmitted on the paging occasion of the corresponding UE. The paging occasion will be described in more detail later.

The paging procedure may be used for notifying change of system information, reception of cell broadcast message (i.e., ETWS/CAMS warning message) and change of EAB as well as notifying reception of individual UE's Mobile Terminated (MT) call.

In case that a UE identity (e.g., IMSI or S-TMSI) is included (i.e., in case that the paging procedure is used for MT call) in one of paging records included in the RRC paging message, the UE in RRC_IDLE mode starts a random access procedure for establishing RRC connection (e.g., transmitting service request) with network.

Also, in case that system information modification (systemInfoModification) is included in the RRC paging message, a UE re-acquires the system information which is required by using a system information acquisition procedure.

In addition, in case that the ETWS indication (etws-Indication) is included in the RRC paging message and a UE supports the ETWS, the UE re-acquires SIB 1 immediately. That is, the UE does not wait for the boundary of the next system information modification cycle. And if the scheduling information list (schedulingInfoList) included in SIB 1 indicates that SIB 10 is existed, the UE acquires SIB 10 based on the scheduling information (schedulingInfor). In addition, if the scheduling information list (schedulingInfoList) included in SIB 1 indicates that SIB 11 is existed, the UE acquires SIB 11 based on the scheduling information (schedulingInfor).

Also, CMAS indication (cmas-Indication) is included in the RRC paging message and a UE supports CMAS, the UE re-acquires SIB 1 immediately. That is, the UE does not wait for the boundary of the next system information modification cycle. And if the scheduling information list (schedulingInfoList) included in SIB 1 indicates that SIB 12 is existed, the UE acquires SIB 12 based on the scheduling information (schedulingInfor).

As such, in case that a cell broadcast message (i.e., ETWS/CAMS message) indication is included in the RRC paging message, a UE receives SIB 10, SIB 11 and SIB 12 by referring to schedulingInfoList of SIB 1. The received SIB 10, SIB 11 and SIB 12 are delivered to a higher layer (e.g., RRC layer) of UE. In the higher layer of UE, the UE displays the message identifier included in the cell broadcast message which is delivered through SIB 10, SIB 11 and SIB 12 if the message identifier is included in a search list of the UE. And otherwise, the UE discard it.

In addition, in case that a UE in RRC_IDLE mode supports the EAB and the EAB parameter modification (eab-ParamModification) field is included in the RRC paging message, the UE regards SIB 14 which is stored before is not valid, and re-acquires SIB 1 immediately. That is, the UE does not wait for the boundary of the next system information modification cycle. And the UE re-acquires SIB 14 using the system information acquisition procedure.

Hereinafter, a paging occasion will be described.

FIG. 13 is a view for describing a paging occasion in a wireless communication system to which the present invention can be applied.

3GPP LTE/LTE-A system defines discontinuous reception (DRX) technique of UE in order to minimize the power consumption of UE.

A UE that uses the DRX monitors whether a paging message is transmitted only one paging occasion for every Paging cycle (i.e., DRX cycle).

One Paging Frame (PF) means one radio frame that may include one or more paging occasion(s).

One paging occasion (PO) means one subframe where the P-RNTI transmitted on the PDCCH that addresses a paging message may be existed. That is, the paging occasion is defined as a specific subframe in a PF that a UE checks a paging message.

The PF and the PO are determined by using IMSI and DRX values of UE. The UE may calculate the PF and the PO using its IMSI and DRX values. In addition, an eNB may also calculate the PF and the PO for each UE through the IMSI value which is delivered from the MME.

The DRX parameter (i.e., paging/PCCH configuration information) may be transmitted with being included in a common radio resource configuration ('RadioResourceConfigCommon') IE which is a RRC message used for specifying common radio resource configurations. The common radio resource configuration IE may be transmitted through a RRC message such as a RRC connection reconfiguration message or an SI message. The SI message is a message which is used for transmitting one or more SIBs.

In addition, a UE may also request its DRX cycle through an attach request or a tracking area update (TAU) request message. At the moment, a DRX cycle length set that the UE may request is identical to the length set which is used in the system information.

Table 5 exemplifies the PCCH configuration information in the common radio resource configuration IE.

TABLE 5

| PCCH-Config ::= | SEQUENCE { |
|---|---|
| defaultPagingCycle | ENUMERATED { |
| | rf32, rf64, rf128, rf256}, |
| nB | ENUMERATED { |
| | fourT, twoT, oneT, halfT, quarterT, |
| | oneEighthT, |
| } | oneSixteenthT, oneThirtySecondT} |

Referring to Table 5, the PCCH configuration information includes the 'defaultPagingCycle' field that indicates a basic paging cycle length and the parameter 'nB' for acquiring the paging frame and the paging occasion.

The 'defaultPagingCycle' field has a basic paging cycle length, and setup as one value of {rf32, rf64, rf128, rf256}. The rf means radio frame, and setup as one value of {rf32, rf64, rf128, rf256}. The rf means radio frame, and the numbers behind the 'rf' means the number of radio frames. For example, if 'defaultPagingCycle'=rf32, the paging basic cycle includes 32 radio frames, and if 'defaultPagingCycle'=rf64, the paging basic cycle includes 64 radio frames.

The value of 'nB' parameter is indicated by a multiple of 'T' (4T, 2T, T, T/2, T/4, T/8, T/16 or T/32). For example, if 'nB'=fourT, the parameter value of 'nB' is 4*T, and if 'nB'=quarterT, the parameter value of 'nB' is T/4.

Here, 'T' represents a DRX cycle of UE. 'T' is determined to the smallest value among a UE-specific DRX cycle and the basic DRX cycle ('defaultPagingCycle' field value) which is broadcasted in the system information. In case that the UE-specific DRX cycle is not setup by a higher layer, 'T' is determined to the basic DRX cycle.

The PF is determined according to Equation 1 below.

$$\text{SFN mod } T = (T \text{ div } N)*(\text{UE\_ID mod } N) \quad \text{[Equation 1]}$$

In Equation 1, N represents min (T, nB), and UE_ID represents (IMSI mod 1024).

A UE does not monitor all subframes of the PF which is determined as above, but monitors only the subframe which is distinguished by the PO determined by Equation 2 below and Table 6 (or Table 7).

$$i\_s = \text{floor}(\text{UE\_ID}/N) \text{ mod } Ns \quad \text{[Equation 2]}$$

In Equation 2, Ns represents max(1, nB/T).

Table 6 exemplifies a subframe pattern for determining the PO in FDD.

TABLE 6

| Ns | PO when i_s = 0 | PO when i_s = 1 | PO when i_s = 2 | PO when i_s = 3 |
|---|---|---|---|---|
| 1 | 9 | N/A | N/A | N/A |
| 2 | 4 | 9 | N/A | N/A |
| 4 | 0 | 4 | 5 | 9 |

Table 7 exemplifies a subframe pattern for determining the PO in TDD.

TABLE 7

| Ns | PO when i_s = 0 | PO when i_s = 1 | PO when i_s = 2 | PO when i_s = 3 |
|---|---|---|---|---|
| 1 | 0 | N/A | N/A | N/A |
| 2 | 0 | 5 | N/A | N/A |
| 4 | 0 | 1 | 5 | 6 |

By applying i_s value which is determined by Equation 2 above to Table 6 and Table 7, the subframe index that corresponds to the PO is determined. That is, a UE monitors only the subframe that corresponds to the PO in the PF which is determined. In the example of FIG. 13, in the case that the DRX cycle of the UE is 320 ms (i.e., 32 radio frames=rf32), radio frame 4 and radio frame 36, and so on may be determined to be the PF based on Equation 1 above. And, the UE monitors the paging message only in subframe 9 of radio frame 4 and subframe 9 of radio frame 36 which is the PO determined based on Equation 2 and Table 6 (or Table 7) above.

Cell Broadcast Service (CBS)

The CBS broadcasts the CBS message which is unacknowledged to all receiving terminals in a specific area. The CBS is also called a Cell Broadcast short message service. The CBS is standardized in the GSM in order to provide a warning message, weather information, position-based news, and so on to a UE on a national scale or in all city areas, and also supported in the U MTS.

The CBS message is broadcasted to the geographic area which is known as the cell broadcast area. This area may include one or more cells or entire PLMNs. Each of the CBS messages may be allocated to its own geographic coverage area. The CBS message is generated from a plurality of Cell Broadcast Entities (CBEs) in connection with a Cell Broad Centre (CBS). And, the CBS message is transmitted to a cell from the CBC according to the coverage requirement of the CBS.

The CBS message is periodically and repeatedly broadcasted by a cell during a duration configured by an information provider. The period that the CBS message is repeatedly transmitted is according to the information that is included in the CBS message. For example, the dynamic information such as the load traffic information is required for more frequent transmission than the weather information. The repetition duration is influenced whether the corresponding message considers the reception of the UE that moves in fast speed.

In order for the UE to selectively display the CBS message which is required by a user, the message class for classifying coding scheme of CBS message and the type of information included in the CBS message is allocated.

A Public Warning System (PWS) is referred to as the general Warning Notification System which is provided by a mobile communication provider that directly delivers the warning information provider and the warning information that provides a warning to the provider by sensing a disaster and warning situation to a UE.

The PWS warning message is delivered to a UE through the CBS mechanism.

The PWS provides a service so as to distribute the Earthquake and Tsunami Warning System (ETWS), the Commercial Mobile Alert System (CMAS), the Korean Public Alert System (KPAS) and the European Public Warning System (EU-Alert) warning message in the GSM, the UMTS and the E-UTRAN.

FIG. 14 exemplifies architecture for the cell broadcast service in a wireless communication system to which the present invention can be applied.

FIG. 14A illustrates the GSM network architecture, FIG. 14B illustrates the UMTS network architecture, and FIG. 14C illustrates the Evolved Packet System (EPS) network architecture.

The GSM network architecture according to FIG. 14A includes the cell broadcast entity (CBE), the cell broadcast center (CBS), the Base Station Controller (BSC) and the Base Transceiver Station (BTSs).

The CBS message is generated from the CBEs and delivered to the BSC via the CBC. And, the BTSs included in the notification area broadcasts the CBS message under the control of the BSC, and a UE receives the CBS message.

In the UMTS network architecture, the GSM based station subsystem (BSS) according to FIG. 14B is replaced by the Universal Terrestrial Radio Access Network (UTRAN) that includes the Radio Network Controller (RNC) and the Node B.

The CBC is configured as a part of the core network, and connected to a routing node (e.g., 3G SGSN via the Bc reference point). Accordingly, the CBC may be reached to all RNCs via the user plane of the Iu interface.

The details in relation to the logical interface protocol between the CBC and the RNC may be incorporated by reference to the document 3GPP TS 25.419, and the details in relation to other UTRAN related interface may be incorporated by reference to the document 3GPP TR 25.925.

Based on the requirement for the architecture and the cell broadcast core network, the core network element such as the Mobile Switching Center (MSC), the Visitor Location Register (VLR), the Home Location Register (HLR), and so on are not included in order to deliver the CBS service.

Referring to FIG. 14C, the CBS message is generated from the cell broadcast entity (CBE), and the CBEs is connected to the corresponding cell broadcast center (CBC). The CBE divides the CBS message into a plurality of pages.

The CBC performs the scheduling function that manages the CBS message. The CBC is configured as a part of the core network and connected to the MME through the SBc reference point.

The details in relation to the interface protocol between the CBC and the MME may be incorporated by reference the document 3GPP TS 29.168 and the details in relation to the interface between the MME and the eNB may be incorporated by reference to the document 3GPP TS 36.413.

The CBS message is broadcasted to the cells included in the notification area, and a UE receives the CBS message.

Hereinafter, the CBS message will be described. In order to describe clearly, the E-UTRAN is mainly described, but the technical feature of the present invention is not limited thereto.

That is, since the CBS transmission procedure is used in order to deliver the warning message in the E-UTRAN, it may be understood that the warning message below has the same meaning as the CBS message.

Message Parameter

Table 8 illustrates a high layer description of the warning message contents.

TABLE 8

| Parameter |
| --- |
| Message Identifier |
| Serial Number |
| CB data (Warning Message Content E-UTRAN) |
| Data Coding Scheme |

Referring to Table 8, the Message Identifier is the parameter for distinguishing the source and type of the warning message.

The Serial Number is the parameter for distinguishing a specific warning message which is transmitted from the source and type indicated by the message identifier.

The Data Coding Scheme is the parameter for distinguishing the language and coding scheme applied to the warning message.

The CB data is the parameter that includes the contents of the warning message. The parameter is made up of the parameter included in the "Warning Message Content E-UTRAN" IE of the 'WRITE-REPLACE WARNING REQUEST' message which is received from the CBC.

In the case of the ETWS, the description for the warning message contents is applied only to the secondary notification.

The details in relation to the warning message may be incorporated by reference to the document 3GPP TS 26.331.

Message Identifier

The Message Identifier is 16 bits and the parameter for identifying the source and type of the CBS message. For example, 'Automobile Association (=source)' and 'Traffic Report (=type)' may correspond to one value. A plurality of CBS messages may be generated from the same source and/or the same type. These may be distinguished by serial numbers that will be described below. The message identifier is coded in binary.

A UE receives and displays the CBS message that has a message identifier included in 'search list'. The search list may include the Subscriber identity module (SIM) and the message identifier included in the UE. In the case that there is a limit in the performance in relation to the number of message identifiers that the UE is available to search for, the message identifier stored in the SIM may have higher priority than the message identifier stored in the UE.

The UE may discard the CBS message of which message identifier value range is between A000 hex (hexadecimal-AFFF hex unless the UE receives it from the Home Public Land Mobile Network (HPLMN), the Equivalent HPLMN (EHPLMN), the HPLMN or the PLMN which is equivalent to the EHPLMN.

A network may use the message identifier only in the range 4352-6399 (1100 hex-18FF hex) for the PWS. When the message identifier of the range is existed in the search list, the UE tries to receive the CBS message.

Serial Number

A plurality of CBS messages may be generated from the same source and/or the same type. These may be distinguished by serial numbers. That is, the serial number is the parameter for distinguishing the CBS message in the same message identifier. This will be described by referring to the drawing below.

FIG. 15 is a view exemplifying the serial number of the CBS message in a wireless communication system to which the present invention can be applied.

Referring to FIG. 15, the serial number is an integer of 16 bits, and distinguishes a specific CBS message from the source and type indicated by the message identifier. The CBS message may have the length from one to fifteen pages. The serial number is changed whenever the CBS message that has the same message identifier is changed.

Two octets of the serial number includes a geographical scope (GS) indicator of 2 bits, a message code of 10 bits and an update number of 4 bits.

The most significant bit (MSB) of the update number is bit 3 of octet 2. The MSB of the message code is bit 5 of octet 1, and the least significant bit (LSB) is bit 4 of octet 2. The MSB of the GS is bit 7 of octet 1.

1) The message code may be summary information (subject/theme) or a command of the CBS message.

The message code distinguishes the CBS message which is generated from the same source and type (i.e., the same message identifier). The message code is allocated by a PLMN operator.

The message code distinguishes different themes. For example, it is assumed that the value for the message identifier is 'Automobile Association (=source)' and 'Traffic Report (=type)'. Here, each of 'collision at A1 J5', 'a wild animal appears at A32 J4' and 'slow vehicle speed at M3 J3' may correspond to a value for the message code.

In the case of the CBS message transmission for the ETWS (i.e., in the case that the message identifier has the value for the ETWS), a part of the message code may activate an emergency user alert to a UE, and may command a message popup for notifying it to a user. The message code format will be described by reference to the drawing below.

Figure 16:
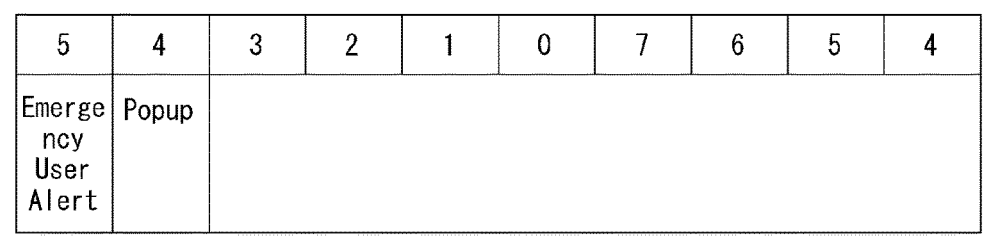

FIG. 16 is a view exemplifying the message code format of the CBS message in a wireless communication system to which the present invention can be applied.

Referring to FIG. 16, the MSB (i.e., bit 5 of octet 1) of the message code may include emergency user alert fields and the next bit (i.e., bit 4 of octet 1) may include popup fields.

The emergency user alert field includes other user alert means such as an alarm tone or vibration according to the performance of a UE.

The popup instruction has precedence over the configuration of GS related to the data coding scheme (DCS) message class and display mode.

Table 9 exemplifies coding of the emergency user alert field and the popup field.

TABLE 9

| Field | Code | Instruction to Terminal |
| --- | --- | --- |
| Emergency User Alert | 0 | No instruction as to emergency user alert |
|  | 1 | Activate emergency user alert |
| Popup | 0 | No instruction as to popup |
|  | 1 | Activate popup on the display |

2) The geographical scope (GS) defines an applicable area by the received message and a display mode.

The GS indicates the geographical area where a intrinsic message code is uniquely distinguished and the display mode. The CBS message may not be broadcasted by all cells in the geographical area.

When two CBS messages that have the same serial number/message identifier are received by two different cells, the GS is used in order to determine whether the CBS messages are actually identical.

Especially, the GS notifies the following information related to the CBS message to a UE.

Only cell wide: it means that the CBS message displayed is disappeared from a screen when a UE selects the next cell and the CBS message received from the next cell is regarded as a new message.

PLMN wide: it means that the message code and/or update number should be changed for the new CBS message in the next cell of the corresponding PLMN. The CBS message is related to the PLMN broadcasted, and accordingly the change of the PLMN (including the change to another PLMN that is an ePLMN) means that the CBS message is a new message.

Location Area wide (applied in the GSM): according to whether the next cell belongs to the same location area of the present cell, the CBS message that has the same message code and update number is determined to be a new message in the next cell.

Service Area wide (applied in the UMTS): according to whether the next cell belongs to the same service area of the present cell, the CBS message that has the same message code and update number is determined to be a new message in the next cell. Here, the service area may be made up of one cell only.

Tracking Area wide (applied in the E-UTRAN): according to whether the next cell belongs to the same tracking area of the present cell, the alert message that has the same message code and update number is determined to be a new message in the next cell.

The display mode indicates whether the CBS message is always displayed as "immediate" or as "normal" only when a user wants to see it. In either case, the CBS message is displayed only in the case that the message identifier in included in a search list in a UE.

Table 10 exemplifies coding of the GS field.

TABLE 10

| GS Code | Display Mode | Geographical Scope |
|---------|--------------|--------------------|
| 00 | Immediate | Cell wide |
| 01 | Normal | PLMN wide |
| 10 | Normal | Location Area wide in GSM, Service Area wide in UMTS, Tracking Area wide in E-UTRAN |
| 11 | Normal | Cell wide |

Referring to table 10, 'immediate' indicates to be displayed directly as default, and 'normal' indicates to be displayed under a user interaction as default.

3) The update number indicates the contents changes of the same CBS message (that is, the CBS messages that have the same message identifier, the geographical scope, and the message code)

That is to say, the update number is a value that distinguishes an older version and newer version of the same CBS messages in the geographical area indicated. The message identifier and the serial number may guarantee the uniqueness of the corresponding CBS message. A new CBS message has an update number '0000', and the update number may be increased by 1 every time the CBS message is updated.

Warning Message Delivery Procedure

The maximum size of the warning message in the E-UTRAN is different from the UTRAN/GERAN.

The eNB may receive the warning messages duplicated. The duplicated messages may be searched by checking the message identifier and the serial number field. The duplicated messages are not transmitted on a wireless interface.

The warning message broadcasted is delivered to a plurality of eNBs through the MME. The broadcast and repetition of a new message for each cell is scheduled by the eNB(s).

The general warning message transmission procedure is described by referring the following drawing.

FIG. 17 is a view exemplifying a warning message transmission procedure in a wireless communication system to which the present invention can be applied.

Referring to FIG. 17, the network registration and security (for example, mutual authentication) procedure is performed (step, S1701).

The step 1701 (S1701) is performed whenever a UE connects to a network (e.g., power on).

The CBE delivers the emergency information to the CBC through the emergency broadcast request message by collecting the PWS emergency information (step, S1702).

The CBE may be a government branch or a private institution. The emergency information may include a warning type, a warning message, an impacted area, a warning duration/time period, and so on.

The CBC distinguishes the MMEs to which the CBS message is required to be transmitted using the impacted area for warning, the warning information element is constructed.

Additionally, the CBC delivers the write-replace warning request message including the warning message that is to be broadcasted, a message identifier, a serial number, a tracking area ID list, a warning area list, an operation and maintenance centre (OMC) ID, a concurrent warning message (CWM) indicator, a response message transmission indication (Send Write-Replace-Warning-Indication), a global eNB ID, a repetition period, an extended repetition period, number/No of broadcast requested, etc. to the MME (step, S1703).

The tracking area ID list is used only by the MME, and the MME uses it in order to select an eNB to which the write-replace warning request message is delivered.

The warning area list indicates an area to which the warning message is required to be broadcasted. The warning area list is made up of the cell ID list or the TAI list or the emergency area ID list. The warning area list is used only by an eNB. The eNB is configured with the TAI to which the eNB itself provide a service or the cell ID and the emergency area ID to which the eNB itself belongs. The eNB checks whether to match the contents of the warning area list to the ID which is configured to the eNB itself, and distinguishes cells for allocating the warning message. The warning area list IE is a selective information element. Accordingly, in the case that the warning area list IE does not exist, it may be understood that are all cells to which the eNB provides a service. The number of cell ID may be limited according to the size of message on SBc and S1-MME. The emergency area ID is unique in the PLMN.

The write-replace warning request message may include the OMC ID.

The OMC ID indicates the identifier of the OMC to which the trace record is going to be transmitted. Therefore, in the case that the OMC ID exists in the write-replace warning request message, it indicates the OMC to which the trace record generated in step, S1711, is going to be transmitted.

In the case that the PLMN supports the broadcast of the coexisted (or concurrent) warning message, the CBC configures the CWM indicator in all the write-replace warning request messages. The CWM indicator indicates that the warning message received from eNB is a new message scheduled for the concurrent broadcast while the broadcasting of another warning message is progressed.

The send write-replace-warning indication instructs the MME to transmit the write-replace warning indication to the CBC. Therefore, in the case that the CBC requests to deliver the broadcast scheduled area list to the CBC itself through the write-replace warning indication message for the warning message to the MME, the CBC configures send write-replace-warning indication. The broadcast scheduled area list indicates that the broadcast is successfully started.

The repetition period indicates the period of the broadcasted warning message in seconds, and has a value between 0 and 4095.

The extended repetition period indicates the period of the broadcasted warning message in seconds. In the case that the repetition period value is greater than 4095, it has a value between 4096 and (217-1).

The number of broadcasts requested represents the number that the CBS message is broadcasted. The number of broadcasts requested may have the value up to 65535. If the value is set to be 0, the CBS message is indefinitely (i.e., till the kill-message request/indication is transmitted) broadcasted.

The MME transmits the write-replace warning confirm message in response to the write-replace warning request message to the CBC (step, S1704).

The Write-Replace Warning Confirm message indicates that the MME starts to distribute the warning message to the eNB.

The Write-Replace Warning Confirm message may include unknown tracking area list. The unknown tracking area list indicates a tracking area to which a request unknown by the MME is not delivered.

In the case that the Write-Replace Warning Confirm message is not received by the CBC in an appropriate time interval, the CBC tries to deliver the warning message through another MME in the same pool area.

The attribute (parameter) shown previously is only one example, and a part of the attribute (parameter) illustrated may be included or above this, an additional attribute (parameter) may be more included.

Also, the attribute (parameter) that is included in the warning message is transparently delivered from the CBC to the UE (that is, it is delivered to eNB).

In the case that the CBC receives the write-replace confirm message from the MME, the CBC informs that the warning message begins to be delivered by transmitting the emergency broadcast response message to the CBE (step, S1705).

The MME delivers the write-replace warning request message to the eNBs which are included in the warning area (step, S1706).

The MME uses the tracking area ID list in order to determine an eNB in the delivery area, in the case that the tracking area ID list is empty nor the global eNB ID is not received from the CBC, the MME delivers the write-replace warning request to all eNBs that are connected to the MME itself. In the case that the global eNB ID is received by the CBC, the MME delivers the write-replace warning request to the eNB only indicated by the global eNB ID.

The eNB broadcasts the warning message to cells according to the attribute of the received warning message (step, S1707), transmits the write-replace warning response message to the MME and confirms the fact that the warning message is broadcasted (step, S1708).

The eNB determines cells where the message is broadcasted by using the warning area information. And, the eNB transmits the warning message to the corresponding cell according to the repetition period (extended repetition period) and the number of broadcast requested value.

When the broadcasting of the warning message is already under progress and the CWM indicator is included in the write-replace warning request message, the eNB does not interrupt the existing broadcast message but starts to broadcast a new message at the same time. Otherwise, the eNB immediately replace the existing broadcast message with a new message.

The eNB regularly broadcasts the warning message according to the attribute configured by the CBC to which the warning message is distributed.

In the case that the UE is configured to receive the warning message, the UE informs the user of the received warning message (step, S1709).

In the case that the warning type is 'earthquake', 'tsunami', or 'earthquake and tsunami', the UE immediately inform the user of it. In the case that the warning type is 'test', the UE discards the primary notice without the user alarm.

In the case that there exists the send warning-message-indication parameter in the write-replace warning request message that is received in the previous step, S1703, the MME transmits the broadcast scheduled area list that includes the write-replace warning indication message to CBC (step, S1710).

The Broadcast Scheduled Area List may include the Broadcast Completed Area List that the MME receives from eNB. The MME may combine the broadcast completed area lists that the MME receive from eNB.

In step S1708, the MME determines whether the warning message delivery is succeeded or failed from the write-replace warning response message that is received from eNB, and generates the trace record for it (step, S1711).

At this point, in order for the trace record to be delivered to the designated destination (i.e., OMC ID), the OMC ID received in step, S1703 is recorded on the trace record.

Warning Message Cancel Procedure

When the CBE requests to cease on-going broadcast of the warning message, the warning message cancel procedure is performed. It is described referring to the below drawing.

FIG. 18 is a view exemplifying a warning message cancel procedure in a wireless communication system to which the present invention can be applied.

Referring to FIG. 18, the CBE starts the warning message cancel procedure by transmitting the stop emergency broadcast request message (for example, a message identifier and a serial number) to the CBC (step, S1801).

The CBC transmits the stop warning request message (a message identifier), a serial number, a tracking area ID list, a warning area, an OMC ID, and a send stop warning indication to the MME(s) (step, S1802).

The Stop Warning Request message may include the OMC ID. In the case that the OMC ID exists, it indicates the OMC to which the trace record generated in step, S1808 is going to be transmitted.

In the case that the CBC requests the broadcast completed area list that is broadcasted through the stop warning indication message for the warning message to the MME, the Send Stop Warning Indication factor is configured.

The MME transmits the Stop Warning Confirm message in response to the Stop Warning Request to the CBC (step, S1803).

The Stop Warning Confirm message indicates to the CBC that the MME starts to distribute the Kill Request message to the eNB.

In case that the CBC does not receive the Stop Warning Confirm message in an appropriate time interval, the CBC tries to deliver the stop warning request message through another MME in the same pool area.

In the case that the CBC receives the stop warning confirm message from the MME, the CBC informs that the warning message cancel procedure is started by transmitting the Stop Emergency Broadcast Response message to the CBE (step, S1804).

The MME delivers the request received from the CBC to the eNB through the Kill Request message (step, S1805).

The MME uses the tracking area ID list in order to determine the eNB in which the broadcasting of the warning message is ongoing. In the case that the tracking area ID list is empty, the kill request message is delivered to all the eNBs that are connected to the MME.

The eNB stops broadcasting the warning message distinguished by a serial number and the message identifier in an area distinguished by the warning area. And, the eNB confirms that broadcasting the warning message is ceased by transmitting the kill response message to the MME (step, S1806).

When the Warning Area is empty, it may be interpreted to be all cells that the eNB serves.

In the case that a Send Warning-Message-Indication parameter is existed in the Stop Warning Request message received in step, S1802 above, the MME delivers the Broadcast Cancelled Area List received from the eNB with being included in the Stop Warning Indication message (step, S1807). The MME may combine the Broadcast Cancelled Area Lists received from the eNB.

When the CBC receives the Stop Warning Indication message transmission from the MME, the CBC stops the Stop Warning Indication message reception for the corresponding warning message, and then releases the serial number of the corresponding warning message.

From the Kill Response message received from the eNB in step, S1806 generates a trace record (e.g., the number of broadcasted message in a designated warning area, etc.) related to the cancelled message (step, S1808).

In this case, the OMC ID received in step, S1802 is recorded in the trace record so that the trace record is delivered to a designated destination (i.e., the OMC ID).

Machine-Type Communication

FIG. 19 is a view exemplifying Machine-Type Communication (MTC) architecture in a wireless communication system to which the present invention can be applied.

A UE used for the MTC (or an MTC UE) and an end-to-end application between MTC applications may use the services provided by a 3GPP system and the selective services provided to the MTC server. The 3GPP system may provide the transmission and communication services (including a 3GPP bearer service, an IMS, and an SMS) including various optimizations for facilitating the MTC.

It is shown in FIG. 19 that the UE used for the MTC is connected to a 3GPP network (e.g., UTRAN, E-UTRAN, GERAN, I-WLAN, etc.) through an Um/Uu/LTE-Uu interface. The architecture shown FIG. 19 includes various MTC models (e.g., a direct model, an indirect model and a hybrid model).

First, the entities shown in FIG. 19 are now described.

In FIG. 19, an application server is a server on a network on which an MTC application is executed. The aforementioned various techniques for implementing the MTC applications may be applied to the MTC application server and a detailed description thereof will be omitted. In addition, in FIG. 19, the MTC application server may access the MTC server through a reference point API, and a detailed description thereof will be omitted. Alternatively, the MTC application server may be collocated with the MTC server.

The MTC server (e.g., an SCS server shown in the FIG. 19) is a server on a network for managing an MTC UE, and may be connected to a 3GPP network to communicate with a UE used for MTC and nodes of PLMN.

An MTC-InterWorking Function (MTC-IWF) may control the interworking between an MTC server and an operator core network, and may play a role of a proxy of an MTC operation. In order to support the MTC indirect or hybrid model, the MTC-IWF may relay or interpret a signaling protocol on a reference point Tsp to operate a specific function in the PLMN. The MTC-IWF may perform a function for authenticating an MTC server before the MTC server establishes communication with a 3GPP network, a function for authenticating a control plane request from the MTC server, various functions related to a trigger indication, etc.

A Short Message Service-Service Center (SMS-SC)/Internet Protocol Short Message GateWay (IP-SM-GW) may manage transmission/reception of a Short Message Service (SMS). The SMS-SC may relay a short message between a Short Message Entity (SME) (i.e., an entity for transmitting or receiving a short message) and a UE, and may serve for a storing-and-delivering function. The IP-SM-GW may serve for a protocol interaction between an IP-based UE and the SMS-SC.

A Charging Data Function (CDF)/Charging Gateway Function (CGF) may perform an accounting related operation.

An HLR/HSS may perform a function for storing subscriber information (e.g., IMSI, etc.), routing information, configuration information, etc., and for providing it to the MTC-IWF.

An MSC/SGSN/MME may perform a control function such as mobility management, authentication, resource allocation, etc., for network connection of the UE. Regarding triggering, a function for receiving a trigger indication from the MTC-IWF and for processing it in a form of a message provided to the MTC UE may be performed.

A Gateway GPRS Support Node (GGSN)/the Serving-Gateway (S-GW)+the Packet Data Network-Gateway (P-GW) may perform a function of a gateway which serves for connection of a core network and an external network.

Table 11 below is a summary of an important reference point in FIG. 19.

TABLE 11

| Reference point | Description |
| --- | --- |
| Tsms | It is the reference point used by an entity outside the 3GPP system to communicate with UEs used for MTC through an SMS. |
| Tsp | It is the reference point used by an entity outside the 3GPP system to communicate with the MTC-IWF related control plane signaling. |
| T4 | A reference point used by the MTC-IWF to route device trigger to the SMS-SC in the HPLMN. |
| T5a | A reference point used between the MTC-IWF and the serving SGSN |
| T5b | A reference point used between the MTC-IWF and the serving MME |
| T5c | A reference point used between the MTC-IWF and the serving MSC |
| S6m | A reference point used by the MTC-IWF to interrogate the HSS/HLR for E.164 MSISDN (Mobile Station International Subscriber Directory Number) or external identifier mapping to IMSI and gather UE reachability and configuration information. |

In Table 11, at least one of the reference points T5a, T5b, and T5c is referred to as T5.

Meanwhile, the user plane communication with the MTC server in case the of the indirect and hybrid model and the communication with the MTC application in the case of the direct and hybrid model may be performed by using the existing protocol through reference points Gi and SGi.

The 3GPP TS 23.682 document may be incorporated by reference for details of the description of FIG. 19.

Group Messaging/Group Based Messaging

A Group Messaging/Group based Messaging (or message delivery to a device group) is proposed for an efficient device handling, and has been progressed as a work item, called GROUPE in current 3GPP Rel-13. In this case, the group messaging is assumed that the device triggering described above is simultaneously applied to a great many UEs belonged to the group, and proposed for an efficient resource management in the case that dozens or thousands of devices such as MTC UEs are simultaneously triggered or receive messages.

The group messaging may be used for efficiently distributing the same message (e.g., trigger request) to the members included in an MTC group located in a specific geographical area according to the request of an SCS/Application Server (AS). Here, an example of the geographical area may correspond to a cell sector, a cell, group of cells or a PLMN.

The group messaging may be progressed in three methods below.

1. Group messaging using a cell broadcast
2. Group messaging using an MBMS
3. Group messaging using an IP multicast Methods 1 and 2 above correspond to methods for delivering a group message such that the UEs belonged to the same group receive a cell broadcast message (case 1) or MBMS data (case 2) in the broadcast scheme, not the unicast scheme.

Hereinafter, the group messaging using the cell broadcast will be described.

The group messaging may be used for triggering a group of MTC devices or transmitting a message when the geographical area where the devices are located is known and/or when a subset of the device in the MTC group located in a specific geographical area is required to be triggered. In this case, the group messaging may be broadcasted based on the cell broadcast service (CBS)/the public warning system (PWS) described above.

The group messaging using the CBS/PWS will be described by reference to the drawing below.

FIG. 20 is a view exemplifying a group messaging architecture based on CBS/PWS in a wireless communication system to which the present invention can be applied.

Referring to FIG. 20, an SCS delivers a group messaging to a CBC through an MTC-IWF, and broadcasts the group messaging in an accessed network by delivering it to a serving node (i.e., BSC, RNC or MME).

In the group messaging architecture based on CBS/PWS, the MTC-IWF performs the role of CBE with respect to the CBC. The architecture reuses the existing protocol such as CBC-BSC, Iu-BC and SBc for transmitting the group messaging to the BSC/RNC/MME.

The group messaging is received in the MTC-IWF through the Tsp interface. The group messaging may include group identification (i.e., an external group identifier, geographic information and group message information. In addition, the group messaging may include RAT and number/frequency/rate for broadcasting trigger/message that are additionally applicable.

Since the cell broadcast for the group messaging is indiscriminately progressed and, in response to the cell broadcast group messaging, a great many UEs transmit a signaling (nearly) at the same time, a congestion of signaling may be caused. Accordingly, a problem is caused to both of a mobile communication network provider and an MTC application owner. In order to distribute the responses of the triggered UEs on time domain, a time window may be included in the group messaging such that a response is arbitrarily performed in the time window.

In the case that the MTC-IWF knows the geographical area where the devices are located or a broadcast message is broadcasted throughout the entire geographical area, the geographical area information may not be transmitted on the Tsp.

The MTC-IWF configures a message ID IE to the group message for the MTC device triggering. The MTC-IWF may inquire to an HLR/HSS, and map an external group identification received through the Tsp interface to an internal cell broadcast group identity.

In order to deliver the group messaging to a specific MTC group, the following identification information of the MTC group (i.e., the internal cell broadcast group identity) may be used.

Cell broadcast message ID IE (hereinafter, message ID)
Group identification information in a cell broadcast message body, selectively When a dedicated message ID is used for the group messaging, it is enough to map a group ID (i.e., external group identifier) to the dedicated message ID in order to specify the MTC group that delivers the group messaging. However, when a plurality of MTC groups shares a message ID, additional group identifier information may be added to the cell broadcast message body.

In addition, the MTC-IWF may add a time window to the cell broadcast message body for the randomization of a response signal transmission of devices.

The MTC-IWF transmits the group messaging to the selected CBC. The MTC-IWF may inquire the HLR/HSS for selecting the CRC node for transmitting a group messaging.

The CBC recognizes a group trigger/message, and allocates a message ID IE to the value allocated for the MTC device triggering. That is, the group trigger/message is distinguished through the PWS warning message and the message ID.

FIG. 20 illustrates the CBS and the MTC-IWF as separate nodes, but the CBS and the MTC-IWF may be implemented as one node by being combined.

An MTC device which is configured to receive a broadcast message listens the broadcast channel(s) for triggering message.

The MTC device reads the message ID used by an application and checks whether the message is the cell broadcast message incoming to the MTC device. In addition, the MTC device may read the group identification information in the cell broadcast message body additionally, and may check whether the message is the cell broadcast message incoming to the MTC device.

Based on the received application PDU, a UE performs a specific operation. For example, the UE may generate application data or establish a connection with SCS/AS, if it is required.

Group Messaging Transceiving Method

A Group Messaging/Group based Messaging (or message delivery to a device group) is proposed for an efficient device handling, and has been progressed as a work item, called GROUPE in current 3GPP Rel-13.

The present invention relates to a Group Feature handling among the features of 3GPP MTC Rel-13, and more particularly, to a method for delivering a group messaging in the Cell Broadcast technique.

The group messaging method (refer to FIG. 21) using the Cell Broadcast technique is similar to the warning message delivery method such as CMAS/ETWS and the like described above. Accordingly, the paging may indicate whether the group message is transmitted through an SIB message.

However, in the case of reusing the existing CMAS/ETWS indication in the paging message, when the existing legacy UE that does not support the group messaging has the same paging occasion, the operation of receiving the group messaging (e.g., SIB 10, 11 and 12) is performed unnecessarily, and accordingly, there is a problem that power consumption is occurred according to it.

Accordingly, the present invention proposes a method for transmitting and receiving a group messaging using a cell broadcast service (CBS) such that the UEs belonged to the UE group that requires the group messaging to enable an efficient operation without influencing the paging procedure and the CBS of the existing legacy UE.

In order to deliver a group messaging only to the UE that supports the group messaging without influencing the existing legacy UE, the following two methods may be used.

Option 1) a New Indicator for a Group Messaging

An indication element (IE) is defined as that indicates whether a group messaging is existed. In the case that the existing legacy UE (e.g., a UE that supports the CMAS/ETWS) does not support the group messaging, the UE may not detect it even though the indicator is activated. In addition, even though the UE detects it, the UE does not receive the corresponding cell broadcast message (e.g., SIB 1, SIBs 10-12).

On the contrary, in the case that the group messaging indication of the received paging message is activated, the UE that support the group messaging receives the corresponding cell broadcast message (e.g., SIB 1, SIBs 10-12). And, in the case that the message identifier of the received cell broadcast message is a group ID of the group to which the UE is belonged or indicates the corresponding group as a source, the UE performs the operation (e.g., device triggering) indicated by the group message contents.

Option 2) Group Paging

This is a method for identifying whether the UE belonged to the corresponding group receives a group messaging by defining a UE identifier for each group, that is, a group identity.

The UE identifier may designate an S-TMSI or an IMSI to the paging record of a paging message. The group to which the group messaging is delivered may be indicated by including the group identity in the paging record without modifying the paging message by defining a group identity in a form such as the S-TMSI or the IMSI. In the case that the group identity of the UE itself belonged to the group is included in the paging message, the group message is received by reading the cell broadcast message (e.g., SIB 1, SIBs 10-12), and the operation indicated by group message contents is performed.

A method for receiving a paging that indicates whether the UEs belonged to a group receives a group message will be described.

In order to deliver an indication on whether to receive a group message using a paging occasion (PO) for each UE belonged to a group without defining the PO for each group, the following operation is required.

A UE monitors a paging by calculating a paging frame (PF) and a PO using the IMSI and the DRX cycle (or period) of the UE itself and the parameter for receiving the paging received from an eNB.

In the case that the eNB knows the IMSI value of the UE belonged to a group or the MME delivers the IMSI value of the individual UE belonged to the group together with a group messaging delivery (e.g., Write-Replace Group Message Request message) to the eNB, the eNB may calculate the PO of all UEs belonged to the group using the IMSI value, and deliver the paging in the PO of all UEs.

However, in the case that there are many UEs belonged to the group or the eNB does not know individual IMSI values of the UEs belonged to the group, the eNB is required to transmit the paging message regarding whether to receive the group message in all POs (i.e., all available POs) allocated to the eNB for a predetermined time. In other words, since the eNB is unable to know which UE is belonged to the corresponding group or which UEs of the corresponding group are included in the coverage of the eNB itself, the eNB is hard to anticipate all POs of the UE belonged to the group. Accordingly, it is required to transmit a paging in all POs (subframe which is available to perform paging that the eNB allows).

As such, when the paging message should be transmitted in a PO for each UE, not defining a PO for each UE, the problem shown in Table 12 below may occur in the case of implementing two options above.

TABLE 12

| Solution | Problem |
|---|---|
| 1 New indicator for group messaging | In the case of using this option, there is a possibility that Paging False Alarm occurs, representatively. That is, since the group message indication is notified without distinguishing groups through a paging message, when the UE which is not belonged to the corresponding group receives the paging in its own PO, the case may occur that the UE also read the cell broadcast message. In this case, the UE receives all group messaging (i.e., cell broadcast message), and the group messaging is delivered to a high layer (e.g., an RRC layer). In the high layer of the UE, the message identifier of the cell broadcast message is read, and it is determined whether the group messaging is the group messaging for the group to which the UE is belonged. As such, a problem occurs that the operation that a UE should read the group messaging occurs unnecessarily, and the power consumption of an MTC UE increases. |
| 2 Group paging | In the case of using this option, there is a possibility that a paging message resource may be insufficient. As described above, in order to indicate the indication on whether to receive the group message, the eNB transmits the group messaging in all POs. In addition, in the case of transmitting the group messaging in several groups simultaneously to the several groups, since a plurality of group identities occupies the paging record of the paging message through several POs, the problem occurs that the paging message resource (i.e., paging record space) that should be used for an incoming call of the UE is insufficient. Since the maximum paging record (maxPageRec) is defined to be 16 currently, the number of UEs that may perform paging simultaneously is 16. However, for example, in the case that four group messages are |

TABLE 12-continued

| Solution | Problem |
| --- | --- |
| | existed, since four group identities occupy the paging record of the paging message transmitted in all POs for a predetermined time, the number of UEs that may perform paging simultaneously decreases to 12. |

Since a problem occurs when solution option 1 or 2 is used as shown in Table 12, the present invention proposes a group message transmission and reception method in order to solve the problem.

Hereinafter, in describing the present invention, the 'Group identity' (hereinafter, referred to as a group ID) may be the 'internal cell broadcast group identity' (i.e., 16 bits) described above. That is, the 'group ID' may be constructed by the 'cell broadcast message ID' solely, and also be constructed by a combination of the 'cell broadcast message ID' and the 'group identification information'.

In addition, in the present invention, the 'group identity' may be an identifier which is defined for each group separately from the 'internal cell broadcast group identity'. For example, the 'group identity' may be an identifier which is allocated for each group in a form such as an IMSI (e.g., 64 bits) or an S-TMSI (e.g., 40 bits) which is allocated to a UE.

In addition, as the system information message that carries the 'group messaging' according to the present invention, SIBs 10 to 12 previously defined may be used, but the system information of a new type may also be used. Hereinafter, this is commonly called and expressed by 'SIB x'.

1) First Embodiment (in the Case that Solution 1 is Used)

In the case that the indication (hereinafter, referred to as 'Group Message Indication') indicating whether a group messaging is existed (or whether a group messaging is transmitted) is included in a paging message, in order to decrease a False Alarm which causes a UE to read a group message unnecessarily, assistance information may be included.

In the case that the Group Message Indication is activated in the paging message, the assistance information may be used for identifying whether the group message for a group to which the UE itself is belonged is transmitted by the UE. That is, the assistance information indicates for which group the transmitted group message is.

The assistance information may include x bits. In the case that $i^{th}$ bit that indicates the group to which the UE itself is belonged is set to '1' among x bits of the assistance information, the UE reads the corresponding group message, and through this process, the false alarm may be decreased. Hereinafter, the $i^{th}$ bit is referred to as a 'Group message discriminating number'.

A UE may acquire the Group message discriminating number based on a group identity or acquiring it in the way of being configured by a network.

First, in the case that a UE acquires the Group message discriminating number based on a group identity, the assistance information may indicate a modular value for the group identity so that the UE may identify whether the group message for the group to which the UE itself is belonged is transmitted. For example, in the case of using (group identity mod 10) (in the case of a unit of digit) or (group identity mod 1024) (in the case of a unit of bit), the assistance information is constructed as 10 bits such as {0, 0, 0, 0, 0, 0, 0, 0, 0, 0}, and the $i^{th}$ bit that corresponds to group identity mod 10 value may be set to '1'.

In addition, a network may configure the Group message discriminating number to a UE through the attach procedure and/or the Tracking Area Update procedure of the UE. Here, in the case that there are many groups managed by the network, x bit number may be more increased. In addition, the Group message discriminating number may be the same for each group. For example, in the case that assistance information includes 10 bits such as {0, 0, 0, 0, 0, 0, 0, 0, 0, 0} as described above, the $i^{th}$ bit that corresponds to the Group message discriminating number for the group to which the UE is belonged may be set to '1'.

FIG. 22 is a view exemplifying a group message transmission and reception method according to an embodiment of the present invention.

The assistance information may be included in a paging message together with a group message indication or transmitted (e.g., broadcasted) to a UE with being included in an assistance message (e.g., SIB 1 or system information message) separately from the paging message.

FIG. 22A exemplifies the case that the assistance information is delivered with being included in a paging message, and FIG. 22B exemplifies the case that the assistance information is broadcasted with being included in the system information.

Referring to FIG. 22A, an eNB transmits a group message indication and a paging message including the assistance information to a UE (step, S2201). In addition, the UE may receive the paging message in the case that the UE reads the assistance information and the group information to which the UE is belonged is activated. That is, in the case that a bit corresponding to a group of the corresponding UE of the assistance information received from the eNB is activated (i.e., in the case that the assistance information indicates that the paging message for the group to which the UE is belonged is going to be transmitted), the UE reads the paging message, and in the case that the group indication of the paging message is activated, the UE receives the group message. In this case, the assistance information is used for indicating whether the paging message is transmitted for each UE group. As such, in the case that the assistance information indicates whether the paging message is transmitted for each UE group, before step, S2201, a step for the UE to receive the assistance information from the eNB may be added, and the paging message may not include the assistance information in step, S2201.

In this case, when the eNB receives a message (e.g., Write-Replace Group Message Request message) that requests a group message transmission including a group identity and/or a Group message discriminating number from a network (e.g., MME), the eNB may identify the UEs belonged to the group that corresponds to the group identity. And, the eNB may transmit the paging message that includes the group message indication and the assistance information for distinguishing the corresponding group to the UE on the paging occasion of the UEs belonged to the corresponding group or on all available paging occasions for a predetermined period. In this case, the assistance information (in the case of not being included in the paging message) may be transmitted through the system information or a common control channel.

In addition, the eNB transmits the group message to the UEs belonged to the corresponding group (step, S2202).

For example, in the case that a modular value (e.g., group identity mod 10) for the group identity to which the UE is belonged is '4', or a Group message discriminating number configured to the group to which the UE is belonged is '4', a group message transmission to the UE is activated (group message indication value is 'true'). And, in the case that the UE receives a paging message that includes {0, 0, 0, 0, 0, 1, 0, 0, 0, 0} as the assistance information, the UE recognizes that its own group message is transmitted and receives a cell broadcast message (i.e., group message).

On the contrary, the UEs of which modular value for the group identity to which the UE itself is belonged is not '4' or the UEs of which Group message discriminating number configured to the group to which the UE is belonged is not '4' do not receive the cell broadcast message (i.e., group message).

That is, in the case that the group message indication value in the paging message is 'true' and the assistance information indicates the group to which the UE is belonged, the UE receives the group message. In other words, based on the group message indication and the assistance information, it is determined whether the UE receives the group message.

As described above, the assistance information may not be included in the paging message but may be transmitted before the paging message. Even in this case, the assistance information may be constructed in the same way above. For example, the assistance information includes 10 bits and each bit position indicates the modular value of the UE IMSI. When the UE receives the assistance information before its own PO and the bit position mapped to its own IMSI mod 10 in the assistance information is activated (i.e., 'true' or '1'), the UE may wake up from its own PO and receive the paging message. On the contrary, when the bit position mapped to its own IMSI mod 10 in the assistance information is not activated, the UE does not receive the paging message.

In the case that the eNB transmits a cell broadcast message (i.e., group message) to the UE through its own system information message, the eNB may transmit the scheduling information list (schedulingInfoList) for the system information message (e.g., SIB x) that carries a group message to the UE through an SIB 1 message. And, the eNB may transmit the group message to the UE through the system information message (e.g., SIB x).

Referring to FIG. 22B, the eNB transmits a paging message that includes a group message indication to the UE (step, S2211).

And, the eNB transmits the assistance message that includes the assistance information to the UE (step, S2212).

In this case, when the eNB receives a message (e.g., Write-Replace Group Message Request message) that request a group message transmission that includes a group identity and/or a Group message discriminating number from a network (e.g., MME), the eNB may identify the UEs belonged to the group that corresponds to the group identity. And, the eNB may transmit the paging message that includes the group message indication on the paging occasion of the UEs belonged to the corresponding group or on all available paging occasion for a predetermined period, and transmit the assistance message that includes the assistance information for distinguishing the corresponding group to the UE.

Here, as an example of the assistance message, the SIB 1 message or system information may be used, and in this case, the SIB 1 message may include the assistance information together with the scheduling information list (schedulingInfoList) for scheduling the group message.

And, the eNB transmits the group message to the UE belonged to the corresponding group (step, S2213).

For example, in the case that a modular value for the group identity to which the UE is belonged is '4', or a Group message discriminating number configured to the group to which the UE is belonged is '4', a group message transmission to the UE is activated (group message indication value of the paging message is 'true'). And, in the case that the UE receives the assistance message (e.g., SIB 1) that includes {0, 0, 0, 0, 0, 1, 0, 0, 0, 0} as the assistance information, the UE recognizes that it is the paging information for its own group and receives a cell broadcast message (i.e., group message).

On the contrary, the UEs of which modular value for the group identity to which the UE is belonged is not '4' or the UEs of which Group message discriminating number configured to the group to which the UE is belonged is not '4' do not receive the cell broadcast message (i.e., group message).

That is, in the case that the group message indication value in the paging message is 'true' and the assistance information in the assistance message indicates the group to which the UE is belonged, the UE receives the group message. In other words, based on the group message indication and the assistance information, it is determined whether the UE receives the group message.

2) Second Embodiment (in the Case that Solution 2 is Used)

In the case that a group paging is used, a Group specific paging occasion may be newly defined. This will be described by reference to drawing below.

FIG. 23 is a view for describing a group paging occasion according to an embodiment of the present invention.

In FIG. 23, it is assumed that a group includes a first UE (UE 1) and a second UE (UE 2). In addition, it is assumed that the same DRX cycle and the same paging frame (PF) are configured to all of the UE (UE 1 and UE 2) belonged to a specific group regardless of individual paging occasion and group paging occasion.

Referring to FIG. 23, in the case of a Group specific paging occasion is defined, an MTC UE, that is, the UE belonged to a group has two types of paging occasions. In FIG. 23, a group paging occasion (2301) and its own specific paging occasion 2302 are configured to the first UE, and the group paging occasion 2301 and its own specific paging occasion 2303 are configured to the second UE.

The UE belonged to a specific group may calculate the Group paging occasion using a group identity in addition to the paging occasion calculated by the IMSI value of the individual UE.

As described above, the paging occasion is calculated by a UE-ID, a DRX cycle and the parameter broadcasted in a cell. That is, in order for the UE to receive an individual paging in Equation 2, the UE-ID is calculated in IMSI mod 1024, and in order for the UE to receive a group paging, the UE-ID is calculated in Group ID mod 1024.

As such the UE that receives a group message calculates two paging occasions. The UE wakes up two times, receives the individual paging for one time and receives the group paging for the remaining time.

As such, when the group paging occasion is defined, since the group identity for delivering the group messaging is included in the paging message only on the group paging occasion, as described above, the problem may be prevented that the group identity is included in all paging messages during a predetermined time, and influences the paging capability of the existing UE.

Meanwhile, in FIG. 23, the case is exemplified that the DRX cycle for the individual paging and the DRX cycle for the group paging are the same for the UEs (i.e., the first UE and the second UE) belonged to the corresponding group, but the present invention is not limited thereto. That is, the DRX cycle for the UE individual paging and the DRX cycle for the group paging may be separately configured. In this case, the DRX cycle for the individual paging may be configured for each UE in a group, and in addition, the DRX cycle for the group paging may be configured to all of the UE in the group commonly.

In addition, the case is exemplified that the paging frame for the individual paging and the paging frame for the group paging are the same for the UEs (i.e., the first UE and the second UE) belonged to the corresponding group, but the present invention is not limited thereto. That is, the paging frame for the UE individual paging and the paging frame for the group paging may be separately determined. For example, in order for the UE to receive the individual paging in Equation 1 above, the UE-ID may be calculated in IMSI mod 1024, and in order for the UE to receive the group paging, the UE-ID may be calculated in Group ID mod 1024.

FIG. 24 is a view exemplifying a group message transmission and reception method according to an embodiment of the present invention.

Referring to FIG. 24, an eNB transmits (e.g., broadcasts) a paging message that includes a group identity to a UE just on a group paging occasion (step, S2401).

In this case, when the eNB receives a message (e.g., Write-Replace Group Message Request message) that requests a group message transmission that includes the group identity from a network (e.g., MME), the eNB may identify the group corresponding to the group identity. And, the eNB may transmit a paging message on the group paging occasion which is determined based on the corresponding group identity to the UE.

And, the eNB transmits the group message to the UE belonged to the corresponding group (step, S2402).

The UE wakes up on the group paging occasion determined based on the group identity which is allocated to the group to which the UE is belonged, and receives the paging message transmitted from the eNB. And, in the case that the group identity of the group to which the UE is belonged is included in the paging message, the UE identifies that its own group message is transmitted, and receives a cell broadcast message (i.e., group message).

In this case, in the case that the eNB transmits the cell broadcast message (i.e., group message) to the UE through a system information message, the eNB may transmit a scheduling information list (schedulingInfoList) for the system information message (e.g., SIB x) that carries the group message to the UE through the SIB 1 message. And, the eNB may transmit the group message through the system information message (e.g., SIB x).

Meanwhile, since the UE that supports the group paging should perform both of the UE individual paging reception and the group paging reception, the UE should wake up two times during the DRX period.

Accordingly, a network may configure an MTC UE that mainly uses a mobile originate call and does not requires a mobile terminated call or the UEs that is available to be processed by the group messaging only to receive the group paging only. For example, during an attach procedure and/or a tracking area update procedure, the network may command the corresponding UE to receive the paging for the group message only by the Group message capability and subscriber information and the configuration information of an MTC user.

In this case, the corresponding UE checks whether the group message is transmitted by identifying the paging message only on the paging occasion calculated by the group identity, not on the paging occasion calculated by its own IMSI value. And, in the case of receiving the corresponding group message, the UE performs an operation according to the contents of the received group message.

In addition, a network may selectively use two embodiments above according to the number of groups. That is, in the case that there are many groups and the paging capacity is insufficient, the network may select the method according to the second embodiment that uses the Group specific paging occasion. However, in the case that there is a few groups, the network may use both of the method according to the first embodiment that uses the Group message indication and the method according to the second embodiment that uses the Group specific paging occasion.

Overview of Devices to which the Present Invention can be Applied

FIG. 25 illustrates a block diagram of a communication device according to one embodiment of the present invention.

With reference to FIG. 25, a wireless communication system comprises a network node 2510 and a plurality of UEs 2520.

A network node 2510 comprises a processor 2511, memory 2512, and communication module 2513. The processor 2511 implements proposed functions, processes and/or methods proposed through FIG. 1 to FIG. 24. The processor 2511 can implement layers of wired/wireless interface protocol. The memory 2512, being connected to the processor 2511, stores various types of information for driving the processor 2511. The communication module 2513, being connected to the processor 2511, transmits and/or receives wired/wireless signals. Examples of the network node 2510 include an eNB, MME, HSS, AS, SCS, and so on. In particular, in case the network node 2510 is an eNB, the communication module 2513 can include an Radio Frequency (RF) unit for transmitting/receiving a radio signal.

The UE 2520 comprises a processor 2521, memory 2522, and communication module (or RF unit) 2523. The processor 2521 implements proposed functions, processes and/or methods proposed through FIG. 1 to FIG. 24. The processor 2521 can implement layers of wired/wireless interface protocol. The memory 2522, being connected to the processor 2521, stores various types of information for driving the processor 2521. The communication module 2523, being connected to the processor 2521, transmits and/or receives wired/wireless signals.

The memory 2512, 2522 can be installed inside or outside the processor 2511, 2521 and can be connected to the processor 2511, 2521 through various well-known means. Also, the network node 2510 (in the case of an eNB) and/or the UE 2520 can have a single antenna or multiple antennas.

The embodiments described above are a combination of constituting elements and features of the present invention in particular forms. Unless otherwise specified, each constituting element or feature should be regarded to be selective. Each constituting element or feature can be embodied solely without being combined with other constituting element or feature. It is also possible to construct embodiments of the present invention by combining part of constituting elements and/or features. The order of operations illustrated in the embodiments of the present invention can be changed. Part of a structure or feature of an embodiment can be included by another embodiment or replaced with the corresponding structure or feature of another embodiment. It should be clear that embodiments can also be constructed by combining those claims revealing no explicit reference relationship with one another, or the combination can be included as a new claim in a revised application of the present invention afterwards.

Embodiments according to the present invention can be realized by various means, for example, hardware, firmware, software, or a combination thereof. In the case of hardware implementation, the embodiments of the present invention can be implemented by one or more of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, microprocessors, and the like.

In the case of firmware or software implementation, methods according to the embodiment of the present invention can be implemented in the form of a module, procedure, or function performing operations described above. Software codes can be stored in a memory unit and executed by a processor. The memory unit, being located inside or outside the processor, can communicate data with the processor through various means known in the fields of the art.

It should be clearly understood by those skilled in the art that the present invention can be realized in a different, particular form as long as the present invention retains the essential features of the present invention. Therefore, the detailed description above should not be interpreted limitedly from all aspects of the invention but should be regarded as an illustration. The technical scope of the invention should be determined through a reasonable interpretation of the appended claims; all the possible modifications of the present invention within an equivalent scope of the present invention should be understood to belong to the technical scope of the present invention.

INDUSTRIAL APPLICABILITY

The method for transmitting and receiving a group messaging in a wireless communication system of the present invention has been described mainly with the example applied to 3GPP LTE/LTE-A system, but may also be applied to various wireless communication systems except the 3GPP LTE/LTE-A system.

The invention claimed is:

1. A method for receiving a group message performed by a user equipment (UE) in a wireless communication system, the method comprising:
    calculating a group specific paging occasion for the UE using a group identity, wherein the UE belongs to a group, has its own specific paging occasion and the calculated group specific paging occasion;
    receiving, from a network node, a paging message on the group specific paging occasion to receive a group message;
    receiving, from the network node, a system information message when the paging message includes a group message indication, wherein the system information message includes assistance information for identifying a group to which the group message is transmitted and scheduling information for scheduling the group message; and
    receiving, from the network node, the group message based on the scheduling information, when the group message for the group to which the UE belongs is transmitted based on the assistance information.

2. The method of claim 1, wherein the assistance information indicates the group identity allocated to each UE group or a modular value for an International Mobile Subscriber Identity (IMSI) for the UE.

3. The method of claim 1, wherein the assistance information indicates a group message discriminating number which is predetermined for each UE group.

4. The method of claim 3, wherein the group message discriminating number is configured through an attach procedure or a tracking area update procedure.

5. The method of claim 1, wherein the group message is transmitted through a system information message.

6. A method for transmitting a group message performed by a network node in a wireless communication system, the method comprising:
    receiving, from a network node, a message that requests a group message transmission;
    transmitting, to a user equipment (UE), a paging message on a group specific paging occasion of the UE, wherein the paging message includes a group message indication;
    transmitting, to the UE, a system information message, wherein the system information message includes assistance information for identifying a group to which a group message is transmitted and scheduling information for scheduling the group message; and
    transmitting, to the UE, the group message based on the scheduling information, when the group message for the group to which the UE belongs is transmitted based on the assistance information.

* * * * *